(12) United States Patent
Kim et al.

(10) Patent No.: US 11,544,038 B2
(45) Date of Patent: Jan. 3, 2023

(54) EFFICIENT ESTIMATOR OF MIN-ENTROPY

(71) Applicant: Western Digital Technologies, Inc., San Jose, CA (US)

(72) Inventors: Yongjune Kim, San Jose, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 253 days.

(21) Appl. No.: 16/916,107

(22) Filed: Jun. 30, 2020

(65) Prior Publication Data

US 2021/0405970 A1    Dec. 30, 2021

(51) Int. Cl.
G06F 7/58    (2006.01)
H04L 9/08    (2006.01)

(52) U.S. Cl.
CPC .............. *G06F 7/58* (2013.01); *H04L 9/0869* (2013.01)

(58) Field of Classification Search
CPC ......... G06F 7/58; G06F 21/31; H04L 9/0869; H04L 2209/26; H04L 9/0643
USPC .......................... 708/205, 250, 255; 380/277
See application file for complete search history.

(56) References Cited

U.S. PATENT DOCUMENTS 10,075,291 B1 * 9/2018 Molaro .................... G06F 16/16
10,983,893 B1 * 4/2021 Riedlinger .......... G06F 11/0751
2010/0332574 A1 * 12/2010 Herbert ............... G06F 9/30007
    708/250
2014/0132429 A1 * 5/2014 Scoville ............. H03M 7/3079
    341/87
2021/0405971 A1 * 12/2021 Kim .......................... G06F 7/58

OTHER PUBLICATIONS

Turan, M. S., et al., "Recommendation for the Entropy Sources Used for Random Bit Generation", NIST Special publication 800-90B, Jan. 2018 (Year: 2018).*
Kim, Y. S., "Low complexity estimation method of Renyi entropy for ergodic sources", Entropy, vol. 20, No. 9, pp. 1-14, Aug. 2018 (Year: 2018).*
Kim Y. S., "Low complexity estimation method of Renyi entropy for ergodic sources", Entropy, vol. 20, No. 9, pp. 14, Aug. 2018 (Year: 2018).*
Turan, M. S., et al., "Recommendation for the Entropy Sources Used for Random Bit Generation", NIST Special ublication 800-90B, Jan. 2018 (Year: 2018).*

(Continued)

*Primary Examiner* — Sanchit K Sarker
(74) *Attorney, Agent, or Firm* — Patent Law Works LLP

(57) ABSTRACT

Disclosed herein is an apparatus for estimating randomness of a random number generator. The apparatus is configured to divide output data (302), generated by the random number generator (704), into blocks (310) of a length (L), estimate a Shannon entropy of a second sub-set (404) of the blocks (310), using a first sub-set (402) of the blocks (310) to initialize the estimating, solve an estimate function, that relates an argument parameter (θ) to the Shannon entropy estimate, to determine a value for the argument parameter (θ) that is indicative of a probability of a most probable block being generated by the random number generator (704) as a new block, and use the length (L) to tune an estimate of randomness of the random number generator (704) calculated based on the value for the argument parameter (θ).

18 Claims, 15 Drawing Sheets

(56) References Cited

OTHER PUBLICATIONS

Turan, M. S., et al., "Recommendation for the Entropy Sources Used for Random Bit Generation", NIST Special Publication 800-90B, Jan. 2018.
Maurer, U. M., "A Universal Statistical Test for Random Bit Generators", Journal of Cryptology (1992) 5: 89-105.
Coron, J. S., "On the security of random sources", in Proc. Int. Workshop Public Key Cryptography. Berlin, Heidelberg: Springer Berlin Heidelberg, Mar. 1999, pp. 29-42.
Kim, Y. S., "Low complexity estimation method of Renyi entropy for ergodic sources", Entropy, vol. 20, No. 9, pp. 1-14, Aug. 2018.
Killmann, W., et al., "A proposal for: Functionality classes for random number generators", AIS 20/ AIS 31, Sep. 18, 2011.
Cover, T. M., et al., "Elements of Information Theory" Second Edition, Wiley-Interscience, 2006.
Rukhin, A. et al., "A Statistical Test Suite for Random and Pseudorandom Number Generators for Cryptographic Applications", NIST Special Publication 800-22 Std., Ref. 1a, Apr. 2010.
Hagerty, P. et al., "Entropy bounds and statistical tests", in Proc. NIST Random Bit Generation Workshop, Dec. 2012, pp. 1-28.
Coron, J. S. et al., "An accurate evaluation of Maurer's universal test", in Proc. Int. Workshop Sel. Areas Cryptography, S. Tavares and H. Meijer, Eds. Springer Berlin Heidelberg, Aug. 1999, pp. 57-71.
Beck, C., "Upper and lower bounds on the Renyi dimensions and the uniformity of multifractals", Physica D, vol. 41, No. 1, pp. 67-78, Jan.-Feb. 1990.

\* cited by examiner

| | |
|---|---|
| Data set s | ABCAACBCABBCABACBCBCA |
| Blocks A | A..AA...A...A.A.....A |
| Distance for A | 1..31...4...4.2.....6 |
| Blocks B | .B....B..BB..B..B.B.. |
| Distance for B | .2....5..31..3..3.2.. |
| Blocks C | ..C..C.C...C...C.C.C. |
| Distance for C | ..3..3.2...4...4.2.2. |
| Distance *D*(s) | 12331352431443243226 |

Fig. 5

EFFICIENT ESTIMATOR OF MIN-ENTROPY

TECHNICAL FIELD

The present technology relates to the field of estimating randomness of entropy sources, and in particular, to estimating a min-entropy of a random number generator.

BACKGROUND

Random numbers are used in a variety of computing applications. Examples of these include cryptographic key generation, simulations and electronic games. An entropy source, for example, a random number generator (RNG), can be used to generate these random numbers. Random number generators are configured to generate random numbers as outputs. Two forms of random number generators are true random number generators (TRNGs) and pseudorandom number generators (also known as deterministic random number generators). TRNGs can be hardware devices that generate outputs in the form of random numbers based on measurements associated with a physical process. For example, a TRNG may generate random numbers based on stochastic noise signals such as thermal nose, the photoelectric effect, radioactive decay or quantum phenomena. Pseudorandom number generators are algorithms that generate outputs in the form of random numbers with properties that approximate the properties of a sequence of truly random numbers. The outputs of pseudorandom number generators are deterministic. A seed is used to initialize pseudorandom number generators, and the outputs are determined by the particular seed used.

Entropy is a measure of the unpredictability, randomness or variability in a closed system. In the context of random number generators, an entropy of a RNG can be interpreted as an average level of uncertainty associated with a particular new output of the RNG. The larger entropy, the greater the uncertainty in predicting the new output of the RNG. There are a number of possible measures for entropy, one of which is min-entropy. Min-entropy measures an effectiveness of a strategy of using the most likely output of an entropy source (e.g. a RNG) as a guess for a new output.

The National Institute of Standards and Technology (NIST) Special Publication 800-90B Series of Recommendations (NIST 800-90B) provides guidance on the construction and validation of Random Bit Generators (i.e. binary RNGs) that can be used for cryptographic applications. NIST 800-90B provides a series of tests that an entropy source may be subject to, and an entropy source that conforms to NIST 800-90B is generally considered to generate outputs with a sufficient amount of randomness to provide security for cryptographic applications. The development of entropy sources that generate unpredictable outputs is difficult, and providing guidance for their design and validation testing can also be difficult. For example, many of the tests of NIST 800-90B are computationally expensive, inefficient, inaccurate and/or overly conservative.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

The present technology seeks to provide improved methods and apparatus for estimating randomness of a random number generator by dividing output data generated by the random number generator into blocks, estimating an entropy of at least some of the blocks, and estimating randomness of the random number generator based on this entropy estimate.

Disclosed herein is a computer-implemented method for estimating randomness of a random number generator. The method comprises: dividing output data, generated by the random number generator, into blocks of a length (L); estimating a Shannon entropy of a second sub-set of the blocks, using a first sub-set of the blocks to initialize the estimating; solving an estimate function, that relates an argument parameter ($\theta$) to the Shannon entropy estimate, to determine a value for the argument parameter ($\theta$) that is indicative of a probability of a most probable block being generated by the random number generator as a new block; and using the length (L) to tune an estimate of randomness of the random number generator calculated based on the value for the argument parameter ($\theta$).

In some embodiments, the tuned estimate of randomness of the random number generator corresponds to an estimate of a min-entropy of the random number generator.

In some embodiments, the blocks are adjacent and do not overlap.

In some embodiments, estimating the Shannon entropy comprises determining a distance value ($D_n(s)$) for each block of the second sub-set. In some embodiments, each distance value ($D_n(s)$) indicates a number of blocks separating that block from a previous instance of the block in the output data; or a number of blocks separating the block from a first block of the first sub-set.

In some embodiments, estimating the Shannon entropy comprises solving a distance value function $g_C(i)$ using each distance value ($D_n(s)$) to determine a distance value function value $g_C(D_n(s))$ for each block of the second sub-set.

In some embodiments, estimating the Shannon entropy comprises determining a standard deviation $\hat{\sigma}$ associated with the distance value function values $g_C(D_n(s))$. In some embodiments, the Shannon entropy is estimated based on a mean of the distance value function values $g_C(D_n(s))$ and the standard deviation $\hat{\sigma}$.

In some embodiments, the output data is represented as $s=(s_1, \ldots, s_n)$; $s_i$ is an output of the output data; the first sub-set comprises Q blocks; the second sub-set comprises K blocks; and estimating the Shannon entropy comprises calculating a test statistic $f_c(s)$ associated with the output data using a Shannon entropy test function:

$$f_c(s) = \frac{1}{K} \sum_{n=Q+1}^{Q+K} g(D_n(s))$$

where, $$g(i) = \frac{1}{\log 2} \sum_{k=1}^{i-1} \frac{1}{k},$$

and $D_n(s)$ is a distance value that is determined for each block of the second sub-set. In some embodiments, each distance value $D_n(s)$ indicates a number of blocks separating that block from a previous instance of the block in the output data; or a number of blocks separating the block from a first block of the first sub-set.

In some embodiments, an expected value of the test statistic ($f_c(s)$) is the estimate of the Shannon entropy.

In some embodiments, the computer-implemented method further comprises calculating a standard deviation ($\hat{\sigma}$) associated with the distance values ($D_n(s)$). In some embodiments, the computer-implemented method further comprises estimating the Shannon entropy based on the test statistic ($f_c(s)$) and the standard deviation ($\hat{\sigma}$).

In some embodiments, estimating the Shannon entropy comprises calculating a lower bound X' of a confidence interval for the test statistic ($f_c(s)$). In some embodiments, the lower bound X' is the estimate of the Shannon entropy.

In some embodiments, calculating the lower bound X' comprises calculating:

$$X' = f_c(s) - 2.576 \frac{\hat{\sigma}}{\sqrt{K}}.$$

In some embodiments, solving the estimate function comprises solving for the argument parameter (θ) in:

$$X'=h(\theta)+(1-\theta)\log_2(B-1)$$

where $$h(\theta)=-\theta \log_2\theta-(1-\theta)\log_2(1-\theta),$$

$$B=2^L,$$

X' is the lower bound of the confidence interval for the test statistic ($f_c(s)$), and (L) is the length.

In some embodiments, the computer-implemented method further comprises using a bisection method to solve the estimate function to determine the value for the argument parameter (θ).

In some embodiments, the estimate function is a modified form of an equality case of Fano's inequality. In some embodiments, the estimated Shannon entropy is substituted for an entropy term of Fano's inequality.

In some embodiments, the estimate of randomness of the random number generator is an estimate of a min-entropy of a sub-set of the blocks.

In some embodiments, the estimate of randomness of the random number generator is determined by calculating:

$$-\log(\theta)$$

where θ is the value for the argument parameter (θ).

In some embodiments, tuning the estimate of randomness of the random number generator comprises dividing the estimate of randomness of the random number generator by the length (L).

In some embodiments, tuning the estimate of randomness of the random number generator comprises calculating:

$$-\frac{\log(\theta)}{L}$$

where θ is the value for the argument parameter (θ) and L is the length.

Disclosed herein is an apparatus for estimating randomness of a random number generator. The apparatus is configured to divide output data, generated by the random number generator, into blocks of a length (L); estimate a Shannon entropy of a second sub-set of the blocks, using a first sub-set of the blocks to initialize the estimating; solve an estimate function, that relates an argument parameter (θ) to the Shannon entropy estimate, to determine a value (θ*) for the argument parameter (θ) that is indicative of a probability of a most probable block being generated by the random number generator as a new block; and use the length (L) to tune an estimate of randomness of the random number generator calculated based on the value for the argument parameter (θ).

Disclosed herein is an apparatus for estimating randomness of a random number generator. The apparatus comprises means for dividing output data, generated by the random number generator, into blocks of a length (L); means for estimating a Shannon entropy of a second sub-set of the blocks, using a first sub-set of the blocks to initialize the estimating; means for solving an estimate function, that relates an argument parameter (θ) to the Shannon entropy estimate, to determine a value (θ*) for the argument parameter (θ) that is indicative of a probability of a most probable block being generated by the random number generator as a new block; and means for using the length (L) to tune an estimate of randomness of the random number generator calculated based on the value for the argument parameter (θ).

BRIEF DESCRIPTION OF DRAWINGS

The technology will be described with reference to the following drawings.

FIG. 5 is a table comprising distance values, according to an embodiment.

DESCRIPTION OF EMBODIMENTS

Entropy sources can be said to generate random outputs. For example, random number generators (RNGS) can be said to generate random numbers. As previously described, true random number generators (TRNGs) may generate random numbers based on stochastic noise signals such as thermal nose, the photoelectric effect, radioactive decay or quantum phenomena. The outputs of (i.e. the numbers generated by) TRNGs may be truly random. Pseudorandom number generators generate outputs in the form of random numbers with properties that approximate the properties of a sequence of truly random numbers. For the purposes of this disclosure, the term "output" is taken to encompass both an output of an entropy source that is truly random (e.g. an output generated by a TRNG that can generate truly random outputs) and an output of an entropy source that approximates, or attempts to approximate generating truly random outputs (e.g. an output generated by a pseudorandom number generator). An output may be in the form of a random number. Also for the purposes of this disclosure, the phrase "random number" is taken to encompass both a number generated by an entropy source that is truly random (e.g. a number generated by a TRNG that can generate truly random numbers) and a number generated by an entropy source that approximates, or attempts to approximate generating truly random numbers (e.g. a number generated by a pseudorandom number generator).

Method of Estimating a Min-Entropy of an Entropy Source

Figure 1:
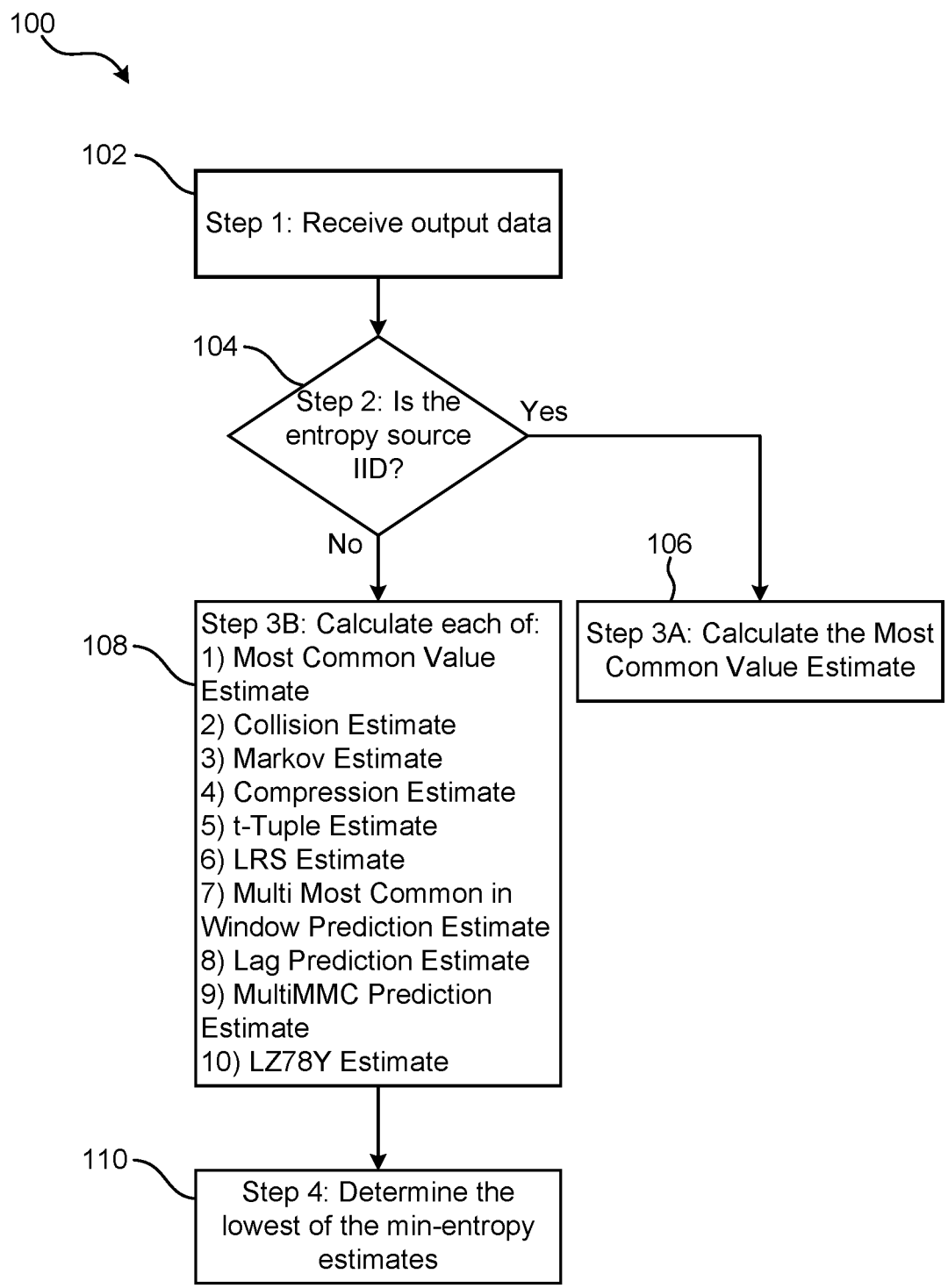
FIG. 1 is a block diagram illustrating a method of estimating a min-entropy of an entropy source.

FIG. 1 is a block diagram illustrating a method 100 of estimating a min-entropy of an entropy source (e.g. a random number generator). The method 100 is recommended for determining a min-entropy of an entropy source in the NIST Special Publication 800-90B Series of Recommendations (NIST 800-90B). The method 100 can be performed by a computer system. The method 100 may be performed as disclosed in M. S. Turan, E. Barker, J. Kelsey, K. A. McKay, M. L. Baish, and M. Boyle, *Recommendation for the entropy sources used for random bit generation, NIST Special Publication* 800-90B *Std.*, January 2018, the content of which is incorporated by reference in its entirety.

The method 100 provides a conservative estimate of the min-entropy of the entropy source, which estimates the effectiveness of guessing a most likely output of the entropy source. For non-independent and identically distributed entropy sources, the method 100 adopts ten different algorithms to estimate the min-entropy. The min-entropy estimates provided by each of these ten algorithms can be different. The lowest of the min-entropy estimates provided by the ten algorithms is selected as the min-entropy of the entropy source.

At step 1, 102, the computer system receives output data from an entropy source. The output data comprises a plurality of random numbers. The entropy source may, for example, be a random number generator. In particular, the entropy source may be a binary random number generator.

At step 2, 104, the computer system determines whether the entropy source is an independent and identically distributed (IID) entropy source, or whether the entropy source is a non-IID entropy source. The computer system may be configured to receive an input indicating whether or not the entropy source is IID. The computer system may analyze the output data to determine whether or not the entropy source is IID. Where the entropy source is IID, the computer system proceeds to step 3A, 106. Where the entropy source is non-IID, the computer system proceeds to step 3B, 108.

At step 3A, 106, the computer system determines a Most Common Value Estimate using the output data. The Most Common Value Estimate is an estimate of an entropy of the output data (and therefore, the entropy source) based on a frequency of a most common value of the output data. The computing system outputs the Most Common Value Estimate as the estimate of the min-entropy of the entropy source.

At step 3B, 108, the computer system determines a plurality of min-entropy estimates using the output data. The computer system calculates a Most Common Value Estimate, a Collision Estimate, a Markov Estimate, a Compression Estimate, a t-Tuple Estimate, a Longest Repeated Substring (LRS) Estimate, a Multi Most Common in Window Prediction Estimate, a Lag Prediction Estimate, a Multi Markov Model with Counting (MultiMMC) Prediction Estimate and a LZ78Y Estimate using the output data. Each of these estimates provides an estimate of the min-entropy of the entropy source.

At step 4, 110, the computer system determines the lowest of the min-entropy estimates determined at step 3B, 108. In other words, the computer system determines a minimum of the min-entropy estimates determined at step 3B, 108. The computing system outputs the lowest of the min-entropy estimates as the estimate of the min-entropy of the entropy source.

Determining the Compression Estimate

One of the estimates used in the method 100 to determine the estimate of the min-entropy of the entropy source is the Compression Estimate 108. Calculating the Compression Estimate comprises calculating an estimate of a lower bound of the min-entropy using Maurer's test and the output data of the entropy source. The output data may be N-bit data, represented as $s=(s_1, \ldots, s_N)$. The Compression Estimate may be calculated as disclosed in M. S. Turan, E. Barker, J. Kelsey, K. A. McKay, M. L. Baish, and M. Boyle, *Recommendation for the entropy sources used for random bit generation, NIST Special Publication* 800-90B *Std.*, January 2018, the contents of which are incorporated by reference in its entirety.

The Compression Estimate was proposed to estimate a lower bound of the min-entropy an entropy source. A min-entropy an entropy source may be said to be equivalent to a min-entropy of outputs of the entropy source. The min-entropy of an entropy source is given by:

$$H^{(\infty)}(B) = -\log_2(\theta)$$

Where $H^{(\infty)}(B)$ is the min-entropy and $\theta$ is value of an argument parameter that is indicative of a probability of a most probable output of the entropy source being generated by the entropy source as a new output.

Figure 2:
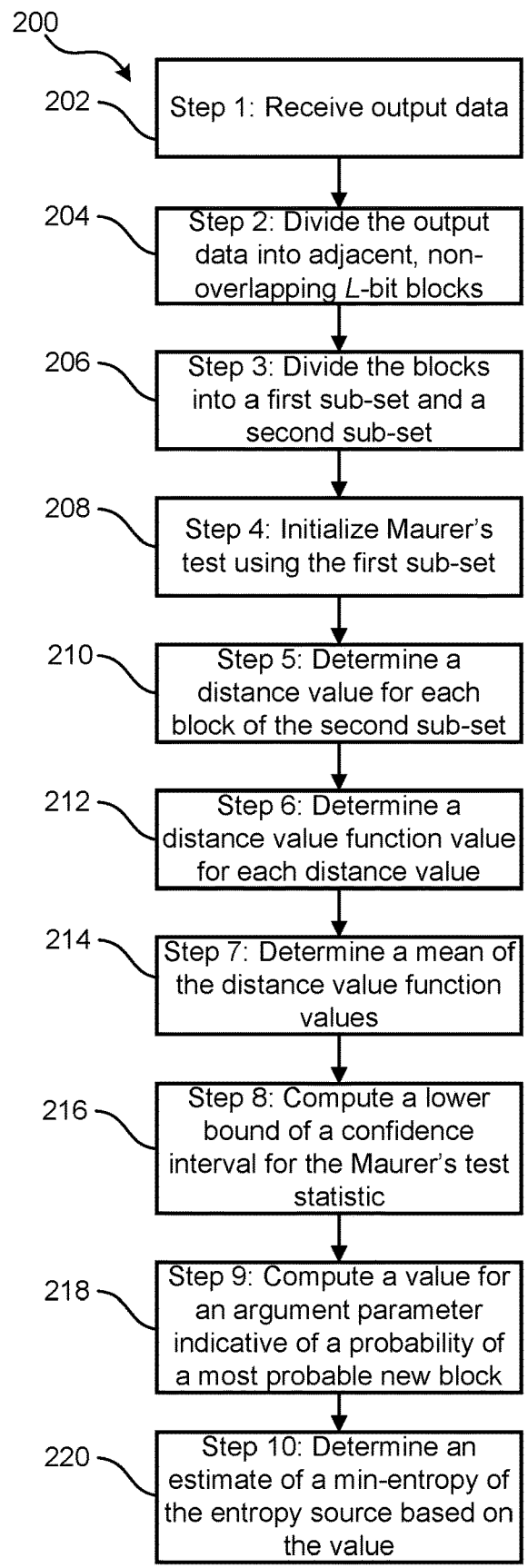
FIG. 2 is a block diagram illustrating another method of estimating a min-entropy of an entropy source.

FIG. 2 illustrates a computer-implemented method 200 for determining the Compression Estimate of output data 302 generated by an entropy source. The method 200 can be performed by a computer system. The method 200 comprises performing Maurer's test on the output data 302 to determine a Maurer's test statistic. The Maurer's test statistic is used to determine an estimate of a min-entropy of the output data 302, and therefore, the entropy source. Maurer's test may be as disclosed in A. Rukhin, J. Soto, J. Nechvatal, M. Smid, E. Barker, S. Leigh, M. Levenson, M. Vangel, D. Banks, A. Heckert, J. Dray, and S. Vo, *A statistical test suite for random and pseudorandom number generators for cryptographic applications*, NIST Special Publication 800-22 Std., Rev. 1a, April 2010, the content of which is incorporated by reference in its entirety. Maurer's test may be as disclosed in P. Hagerty and T. Draper, *Entropy bounds and statistical tests, in Proc. NIST Random Bit Generation Workshop*, December 2012, pp. 1-28, the content of which is incorporated by reference in its entirety.

Figure 3:
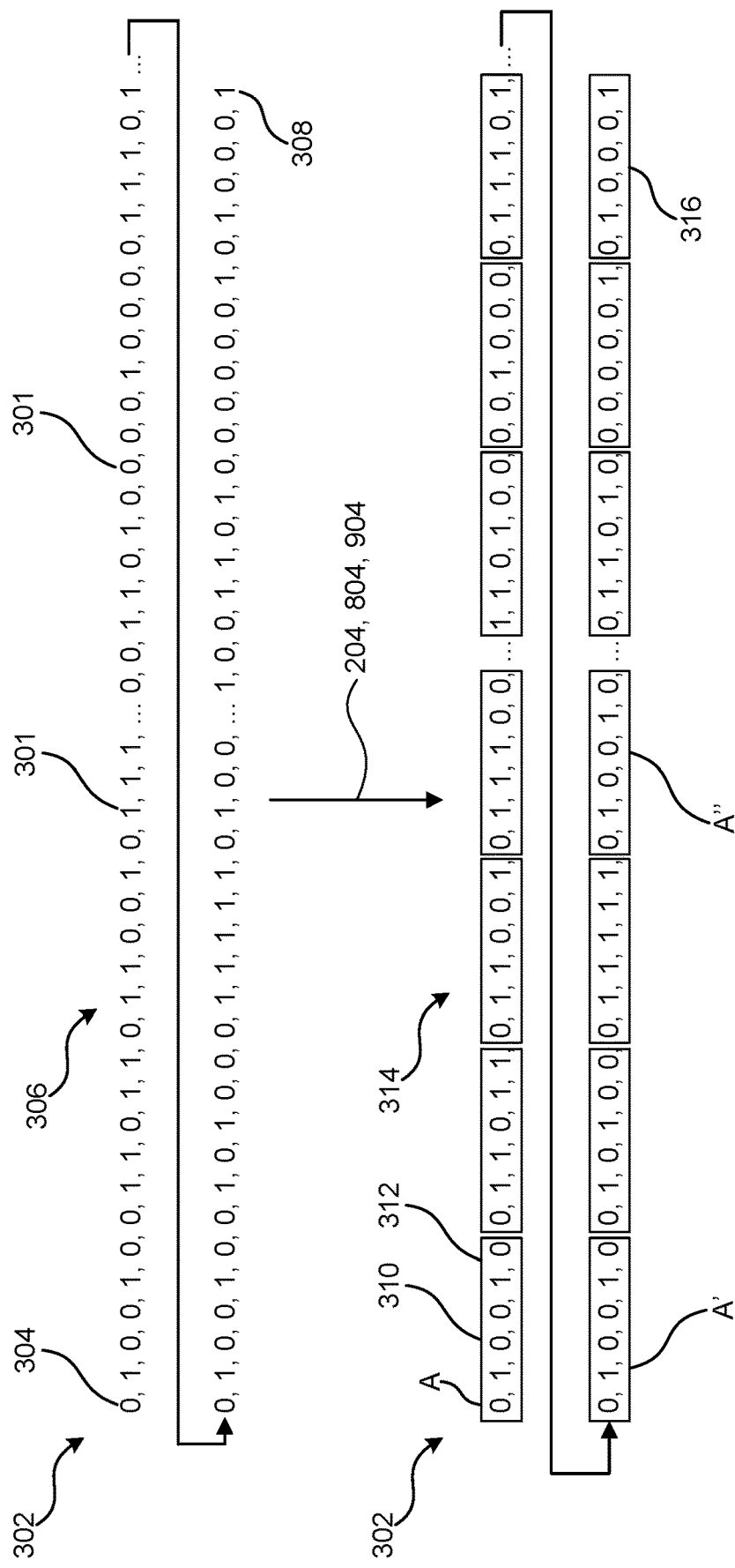
FIG. 3 is a diagram illustrating output data that is divided into blocks, according to an embodiment.

At step 1, 202, the computer system receives output data 302 generated by an entropy source (e.g. a binary random number generator). The output data 302 generated by the entropy source may be considered input data for the method 200. The output data 302 may be represented as $s=(s_1, \ldots, s_N)$ where $s_1$ to $s_N$ are outputs 301. FIG. 3 illustrates an example of output data 302 generated by the entropy source that may be processed by the computer system. The output data 302 is a series of random numbers generated by a binary random number generator. The output data 302 comprises a plurality of outputs 301 of the entropy source in the form of binary random numbers. That is, each output 301 is a 1-bit output. In particular, the output data 302 comprises a first output 304, a plurality of intermediate outputs 306 and a last output 308.

At step 2, 204, the computer system divides the output data 302 into blocks 310 of a length L. The blocks 310 may be considered L-bit blocks. The blocks 310 are adjacent and non-overlapping. FIG. 3 illustrates the output data 302 divided into adjacent, non-overlapping blocks 310 of the length L. The output data 302 comprise a first block 312, a plurality of intermediate blocks 314 and a last block 316. The computer system divides the output data 302 into m blocks. The last block 316 may therefore be considered an mth block. Each block 310 may have an associated block number corresponding to the number the respective block 310 takes in the output data 302. For example, the first block 312 may have an associated block number of 1. The last block 316 may have an associated block number of m. Where the number of outputs 301 does not evenly divide into blocks 310 of the length L, the computer system may truncate the remaining outputs 301. The computer system may divide the output data 302 into L-bit blocks, where L=6. Each block 310 comprises a data sequence. For example, the data sequence of the first block 312 is [0, 1, 0, 0, 1, 0]. The data sequence of the last block 316 is [0, 1, 0, 0, 0, 1]. The data sequences of the first block 312 and the last block 316 are therefore different. The data sequences of two blocks 310 may be considered to be the same if the two blocks 310 comprise the same data sequence. That is, if each output 301 and order of each output 301 of one block 310 is the same outputs 301 of a different block 310, the blocks 310 can be considered to comprise the same data sequence. Each of these blocks 310 may be considered an instance of that data sequence. In some embodiments, the data sequences may be referred to as patterns. For example, with reference to FIG. 3, the data sequences of blocks A, A' and A" are the same.

Figure 4:
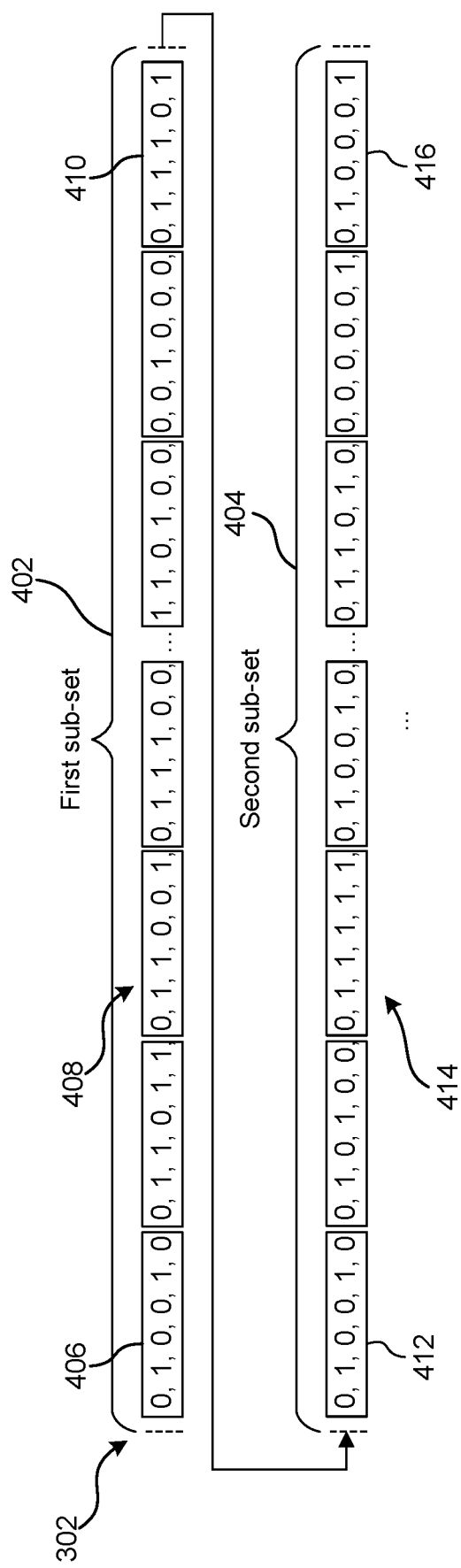
FIG. 4 is a diagram illustrating output data that is divided into blocks, which are divided into a first sub-set and a second sub-set, according to an embodiment.

At step 3, 206, the computer system divides the blocks 310 into a first sub-set 402 and a second sub-set 404. FIG. 4 illustrates the output data 302 divided into the first sub-set 402 and the second sub-set 404. The first sub-set 402 comprises a number Q of blocks 310. The first sub-set 402 therefore comprises a first sub-set first block 406, a plurality of first sub-set intermediate blocks 408 and a first sub-set last block 410. The first sub-set last block 410 may be considered a Qth block. The number Q of blocks of the first sub-set can be relatively large. For example, the number Q of blocks of the first sub-set 402 can be $10 \times 2^L$. The second sub-set 404 comprises a number K of blocks 310. The second sub-set 404 therefore comprises a second sub-set first block 412, a plurality of second sub-set intermediate blocks 414 and a second sub-set last block 416. The second sub-set first block 412 may be considered a (Q+1)th block 412. The second sub-set last block 416 may be considered a (Q+K)th block 416. Therefore:

$$m=Q+K$$

And:

$$N=(Q+K) \times L$$

The N-bit output data 310 may therefore be said to be divided into adjacent, non-overlapping blocks 310 as follows:

$$b(s)=(b_1, \ldots, b_{Q+K})$$

Where b(s) is a set of the blocks 310, $b_n$ is an nth block 310 of the output data 310 (where $1 \leq n \leq m$), $b_n=(s_{L(n-1)+1}, \ldots, s_{Ln})$ (which may have an associated block number i), and where $s_{L(n-1)+1}$ to $s_{Ln}$ are outputs 301 that form $b_n$. That is, the set $b_n$ may be defined such that $b_n \in \{0, \ldots, 2^L-1\}$.

Computing Maurer's Test Statistic

At steps 4 to 7, 208 to 214, the computer system computes a Maurer's test statistic $f_M(s)$ for the output data 302. Computing the Maurer's test statistic $f_M(s)$ may be referred to as performing Maurer's test on the output data 302. An expected value of the Maurer's test statistic may be denoted as $E(f_M(s))$. The computer system may compute the Maurer's test statistic as may be described in U. M. Maurer, "*A universal statistical test for random bit generators,*" J. Cryptol., vol. 5, no. 2, pp. 89-105, January 1992, the content of which is incorporated by reference in its entirety.

At step 4, 208, the computer system initializes Maurer's test using the first sub-set 402. That is, the blocks 310 of the first sub-set 402 are used as reference blocks that provide initial positions in the output data 302 for each data sequence of the blocks 310. The initial positions of each data sequence in the first sub-set 402 may be stored as initialization data that comprises the block number that is associated with a block 310 that comprises a particular data sequence. For example, for the case of the first block 312, the block number may be set to a value of n=1, and the data sequence [0, 1, 0, 0, 1, 0] may be associated with the block number n=1. The data sequence [0, 1, 0, 0, 1, 0] may be stored an alphanumeric representation such as 1, A or the like. Where different, another data sequence may be stored as another alphanumeric representation such as 2, B or the like. Q should be chosen such that $Q \geq 2^L$.

At step 5, 210, the computer system determines a distance value $D_n(s)$ for each block 310 of the second sub-set 402. The distance value $D_n(s)$ of each block 310 is indicative of a number of blocks 310 separating the respective block 310 from a closest previous instance of that block 310. That is, the distance value $D_n(s)$ of a particular block 310 that comprises a particular data sequence indicates a number of blocks 310 separating that block 310 from the most recent previous block 310 that comprises the same data sequence. Where there is no previous instance of the block 310, the distance value $D_n(s)$ is set to a value equal to n (i.e. the block number of the block 310).

The distance values $D_n(s)$ may therefore be given by:

$$D_n(s) = \begin{cases} n, & \text{if } \forall\, i < n,\, b_{n-i} \neq b_n, \\ \min\{i : i \geq 1,\, b_n = b_{n-i}\}, & \text{otherwise.} \end{cases}$$

Where, as previously described, $b_n$ is the block 310 under consideration.

FIG. 5 illustrates a table 500 comprising distance values $D_n(s)$, 504 that have been determined for a data set s, 506 in accordance with step 5, 210 of the method 200. The data set s, 506 may be output data generated by the entropy source. The data set s, 506 comprises, for simplicity, blocks 310 of three different data sequences. Blocks 310 that comprise a first data sequence are indicated as A. Blocks 310 that comprise a second data sequence are indicated as B. Blocks that comprise a third data sequence are indicated as C. A distance value $D_n(s)$, 504 is shown to be associated with each of the blocks 310. The distance values $D_n(s)$, 504 shown associated with each block 310 that comprises the first data sequence A are determined by calculating the number of blocks 310 between the relevant block 310 and a previous block 310 comprising the first data sequence A. The same is done for each of the blocks 310 comprising the second data sequence B and the third data sequence C. The distance values $D_n(s)$, 504 are shown in a bottom row of the table 500, corresponding to their respective block 310.

At step 6, 212, the computer system determines a distance value function value $g_M(D_n(s))$ for each distance value $D_n(s)$. Each distance value function value $g_M(D_n(s))$ is determined by computing a distance value function $g_M(q)$, using a respective distance value $D_n(s)$ as an argument q of the distance value function $g_M(q)$.

The distance value function $g_M(q)$ of the method 200 is:

$$g_M(q) = \log_2(q)$$

Each distance value function value $g_M(D_n(s))$ is therefore determined by computing, for each distance value $D_n(s)$:

$$g_M(D_n(s)) = \log_2(D_n(s))$$

The processor 706 will therefore calculate K distance value function values $g_M(D_n(s))$.

At step 7, 214, the computer system determines a mean of the distance value function values $g_M(D_n(s))$. The mean of the distance value function values $g_M(D_n(s))$ is the Maurer's test statistic $f_M(s)$. The Maurer's test statistic $f_M(s)$ may therefore be determined by computing:

$$f_M(s) = \frac{1}{K} \sum_{n=Q+1}^{Q+K} \log_2(D_n(s))$$

If an infinitely large sample size were available (i.e. if $K = \infty$), the computed value for the Maurer's test statistic $f_M(s)$ would be equal to the expected value $E(f_M(s))$. That is:

$$f_M(s) \rightarrow E(f_M(s)) \text{ as } K \rightarrow \infty$$

At step 8, 216, the computer system computes a lower bound X' of a confidence interval for the Maurer's test statistic $f_M(s)$. The computer system sets X to a value equal to the Maurer's test statistic $f_M(s)$, where X is a random variable. The computer system calculates a standard deviation $\hat{\sigma}$ of the random variable X, where the distance value function values $g_M(D_n(s))$ are instances of the random variable X. The computer system therefore calculates a variance of the random variable X, where the distance value function values $g_M(D_n(s))$ are instances of the random variable X. That is, the computer system computes $\hat{\sigma} = c \sqrt{\mathrm{Var}(\log_2(D_n(s)))}$. c is a corrective factor by which the standard deviation $\hat{\sigma}$ is reduced compared to what it would have been if the distance values $D_n(s)$ were statistically independent.

The computer system computes the lower bound X' of the confidence interval for the Maurer's test statistic $f_M(s)$, by computing $$X' = X - \frac{2.576\hat{\sigma}}{\sqrt{K}}.$$

The constant 2.576 corresponds to a confidence interval of 99%. It will be appreciated however, that this number may be tuned in alternative calculations where a different confidence interval is considered. The lower bound X' of the confidence interval for the Maurer's test statistic $f_M(s)$ is used as a conservative estimate of the expected value of the Maurer's test statistic $E(f_M(s))$.

The expected value of the Maurer's test statistic $E(f_M(s))$ is related to the Shannon entropy of the blocks 310 of the second sub-set 404 such that:

$$\lim_{L \to \infty} [E(f_M(s)) - H(B)] \cong C$$

Where $E(f_M(s))$ is the expected value of the Maurer's test statistic $f_M(s)$, H(B) is the Shannon entropy of the blocks 310 of the second sub-set 404 and C is a constant. It has been shown that C can be equal to −0.8327462. The lower bound X' of the confidence interval for the Maurer's test statistic $f_M(s)$, and therefore the expected value of the Maurer's test statistic $E(f_M(s))$ are asymptotically related to the Shannon entropy H(B) the blocks 310 of the second sub-set 404. The asymptotic relation may be as may be described in J.-S. Coron and D. Naccache, "*An accurate evaluation of Maurer's universal test,*" in Proc. Int. Workshop Sel. Areas Cryptography, S. Tavares and H. Meijer, Eds. Springer Berlin Heidelberg, August 1999, pp. 57-71, the content of which is incorporated by reference in its entirety.

The Shannon entropy for L-bit blocks may be defined:

$$H(B) = -\sum_{b=0}^{B-1} p_b \log_2 p_b$$

Where $B = 2^L$ and $p_b = P(b)$ for $b \in [0, B-1]$. That is, $p_b$ is a probability P(b) indicative of a particular block 310 (i.e. a block 310 comprising a particular data sequence) of the blocks 310 being generated as a new output of the entropy source.

Thus, a min-entropy $H^{(\infty)}(B)$ of the blocks may be given by:

$$H^{(\infty)}(B) = \min_{b \in \{0,\ldots,B-1\}} (-\log_2 p_b) = -\log_2 \left( \max_{b \in \{0,\ldots,B-1\}} p_b \right)$$

Where, again, $B=2^L$ and $p_b=P(b)$ for $b \in [0, B-1]$. That is, $p_b$ is a probability indicative of a particular block 310 (i.e. a block 310 comprising a particular data sequence) of the blocks 310 being generated as a new output of the entropy source. Therefore:

$$\max_{b \in \{0,\ldots,B-1\}} p_b = \theta$$

Where $\theta$ is an argument parameter that is indicative of the probability of a most probable new output block being generated by the entropy source.

This may be as may be described in P. Hagerty and T. Draper, "*Entropy bounds and statistical tests,*" in *Proc. NIST Random Bit Generation Workshop*, December 2012, pp. 1-28, the content of which is incorporated by reference in its entirety.

The lower bound X' of the confidence interval of the Maurer's test statistic $f_M(s)$, and therefore, the estimated expected value of the Maurer's test statistic E ($f_M(s)$) are not estimates of the Shannon entropy H(B) of the blocks 310. Rather, lower bound X' of the confidence interval of the Maurer's test statistic $f_M(s)$, and therefore, the expected value of the Maurer's test statistic E ($f_M(s)$) are asymptotically related to the Shannon entropy H(B) for the blocks 310.

At step 9, 218, the computer system computes a value for the argument parameter $\theta$ by solving the following:

$$X' = G(\theta) + (2^L - 1)G\left(\frac{1-\theta}{2^L - 1}\right)$$

Where:

$$G(z) = \frac{1}{L} \sum_{n=Q+1}^{Q+K} \sum_{i=1}^{n} F(z, n, i) \cdot \log_2 i$$

And:

$$F(z, n, i) = \begin{cases} z^2(1-z)^{i-1}, & \text{if } i < n; \\ z(1-z)^{n-1}, & \text{if } i = n. \end{cases}$$

That is, the computer system equates the lower bound X' of the confidence interval of the Maurer's test statistic $f_M(s)$ (and therefore, an estimate of the expected value of the Maurer's test statistic E ($f_M(s)$)) to a non-closed form equation comprising the argument parameter $\theta$. The value of the argument parameter $\theta$, when equated to the lower bound X' of the confidence interval of the Maurer's test statistic $f_M(s)$ is indicative of a probability of a most probable block being generated by the entropy source as a new block.

The computer system solves for the value of the argument parameter $\theta$ using the bisection method. This is necessary because the equation being solved is not a closed form equation.

Without loss of generality, we can assume that $p_0 \geq p_1 \geq \ldots \geq p_{B-1}$ where $B=2^L$, and where $p_0, p_1, \ldots, p_{B-1}$ are indicative of probabilities that the first block 312, a second block, . . . and the nth block respectively will be generated as a new output of the entropy source.

It has been shown that the following near-uniform distribution corresponds to a lower bound on the min-entropy for a given Maurer's test statistic:

$$P_\theta(b) = \begin{cases} \theta, & \text{if } b = 0, \\ \dfrac{1-\theta}{B-1}, & \text{otherwise.} \end{cases}$$

Where $P_\theta(b)$ is indicative of a probability that particular block b will be generated as a new output of the entropy source. Hence, the lower bound on the min-entropy can be obtained by solving for a value of the argument parameter $\theta$ in:

$$X' = G(\theta) + (2^L - 1)G\left(\frac{1-\theta}{2^L - 1}\right) \tag{1}$$

And using the value for the argument parameter $\theta$ to determine the lower bound on the min-entropy of the entropy source.

At step 10, 220, the computer system determines an estimate of the min-entropy of the entropy source based on the value of the argument parameter $\theta$. In particular, the computer system determines a lower bound of a per-bit min-entropy of the entropy source. The lower bound of the per-bit min-entropy is determined by calculating:

$$H^{(\infty)} \geq \begin{cases} -\dfrac{\log_2 \theta}{L}, \\ 1, \end{cases}$$

if the bisection method of step 9, 218 yields a solution, otherwise.

Where $H^{(\infty)}$ is the per-bit min-entropy of the entropy source and $\theta$ is the value of the argument parameter $\theta$ determined at step 9, 218. Computation of $-\log_2 \theta$ provides a lower bound of a min-entropy of the blocks 310 of the second sub-set 404. This is divided by the length L to determine the lower bound of the min-entropy of the entropy source. The computer system outputs the lower bound on the per-bit min-entropy of the entropy source. That is, the computer system outputs the per-bit min-entropy $H^{(\infty)}$ of the entropy source.

Disadvantages of the Compression Estimate (method 200)

Figure 6:
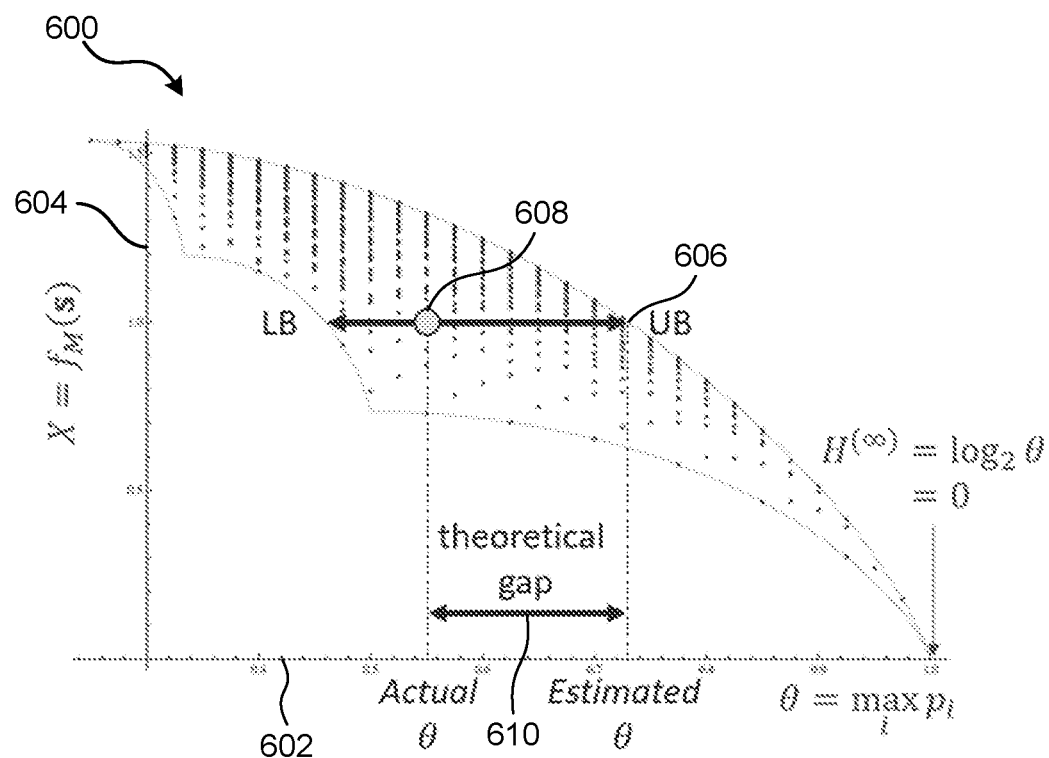
FIG. 6 is a chart illustrating a theoretical gap between an estimated value of an argument parameter associated with an entropy source, and a value of the argument parameter associated with the entropy source.

FIG. 6 illustrates a chart 600 comparing values of the argument parameter $\theta$ on an x-axis 602 and values of the Maurer's test statistic $f_M(s)$ on a y-axis 604. The method 200 uses the lower bound X' of the confidence interval for the Maurer's test statistic $f_M(s)$ to calculate the value of the argument parameter $\theta$. The determined value 606 of the argument parameter $\theta$ is therefore an upper bound on the possible values of the argument parameter $\theta$, and is also likely to be greater than the actual probability, 608 of the most likely block 310 being output as the next output of the entropy source. There is therefore a theoretical gap 610 between the determined value 606 of the argument parameter $\theta$ and the actual probability, 608 of the most likely block 310 being output as the next output of the entropy source. This theoretical gap 610 results in the estimated min-entropy being lower than an actual min-entropy of the entropy source. The method 200 is therefore overly conservative.

The two summation operators in the G(z) function of step 6, 212 of the method 200 increase the computational complexity of step 6, 212. The computational complexity of step 6, 212 is of the order of $SK^2$ (i.e. $O(SK^2)$), where S represents a number of iterations of the bisection method. That is, S may be, or may be proportional to a number of iterations performed when executing the bisection method to solve the estimate function. That is, the computational complexity of step 6, 212 is quadratically related to the number K of blocks 310 of the second sub-set 404. There is therefore a quadratically higher computational cost to include more blocks 310 in the second sub-set 404 (i.e. to reduce variance). The inclusion of more blocks 30 in the second sub-set 404 decreases the variance of the Maurer's test statistic $f_M(s)$, and therefore improves the quality of the min-entropy estimate. The quadratic increase in computational complexity therefore significantly increases the cost of improving the quality of the min-entropy estimate using the method 200.

Step 4, 208 of the method 200 requires the first sub-set 402 of blocks 310 to initialize the computation of the Maurer's test statistic $f_M(s)$ as described. This requirement decreases the number of blocks 310 that can be used to determine the estimate of the min-entropy of the entropy source. That is, the first sub-set 402 is not fully exploited to compute the Maurer's test statistic $f_M(s)$, which may decrease its accuracy. This requirement also requires the method 200 to be performed offline. That is, the method 200 can only be performed in batches, and cannot be used to estimate the entropy of the entropy source, and therefore verify its randomness dynamically as new outputs are generated by the entropy source.

As equation (1) of step 6, 212 is a non-closed form equation, the bisection method (or binary search method) is required to perform step 6, 212. The bisection method (or binary search method) can limit the accuracy of the determined value for the argument parameter θ, and thereby reduce the quality of the min-entropy estimate provided by the method 200. Performing the binary search method is also computationally expensive.

Apparatus for Estimating Randomness of an Entropy Source

Figure 7:
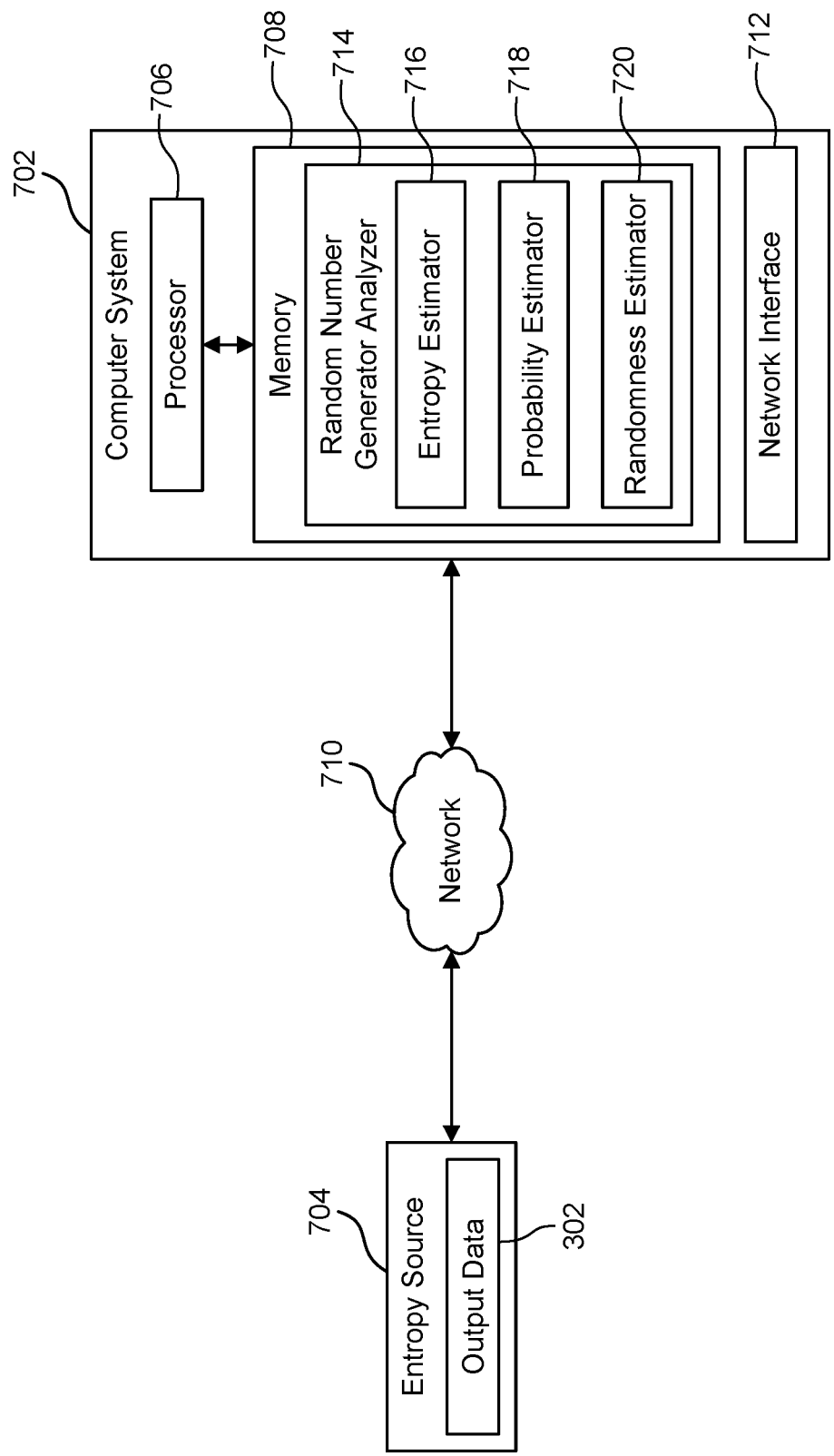
FIG. 7 is a block diagram illustrating a computer system for estimating randomness of an entropy source, according to an embodiment.

FIG. 7 is a block diagram illustrating an apparatus which is configured to estimate randomness of an entropy source according to an embodiment. In particular, FIG. 7 is a block diagram illustrating a computer system 702 which is configured to estimate randomness of an entropy source 704 according to an embodiment. In some embodiments, the entropy source 704 is a random number generator. In particular, in some embodiments, the entropy source 704 is a binary random number generator. The entropy source 704 is configured to generate output data 302. For example, in some embodiments, the entropy source 704 is configured to generate the output data 302 described with respect to FIG. 3. The output data 302 may be represented as $s=(s_1, \ldots, s_N)$ where $s_1$ to $s_N$ are the outputs 301. The output data 302 comprises random outputs generated by the entropy source 704. In particular, the output data 302 comprises a series of random numbers generated by a binary random number generator. The output data 302 comprises a plurality of outputs 301 of the entropy source in the form of binary random numbers. That is, each output 301 is a 1-bit output. In particular, the output data 302 comprises a first output 304, a plurality of intermediate outputs 306 and a last output 308, as previously described. The computer system 702 is configured to estimate randomness of the entropy source 704 based on the output data 302.

The computer system 702 comprises a processor 706 in communication with memory 708. The processor 706 is configured to execute instructions stored in memory 708 to cause the computer system 702 to function according to the described methods below. In some embodiments, the instructions are in the form of program code. The processor 706 may comprise one or more microprocessors, central processing units (CPUs), application specific instruction set processors (ASIPs), application specific integrated circuits (ASICs) or other processors capable of reading and executing program code. In the illustrated embodiment, the instructions comprise a random number generator analyzer 714. The processor 706 is configured to execute the random number generator analyzer 714 to estimate randomness of the entropy source 704, as is described in more detail below.

Memory 708 may comprise one or more volatile or non-volatile memory types. For example, memory 708 may comprise one or more of random access memory (RAM), read-only memory (ROM), electrically erasable programmable read-only memory (EEPROM) or flash memory. Memory 708 is configured to store program code accessible by the processor 706. The program code may comprise executable program code modules. In other words, memory 708 is configured to store executable code modules configured to be executable by the processor 706. The executable code modules, when executed by the processor 706 cause the computer system 702 to perform certain functionality, as described in more detail below. In the illustrated embodiment, the random number generator analyzer 714 is in the form of program code stored in the memory 708. In some embodiments, the computer system 702 may comprise a storage device.

As illustrated in FIG. 7, the random number generator analyzer 714 comprises an entropy estimator 716. The processor 706 is configured to execute the entropy estimator 716 to estimate an entropy associated with the output data 302, as is described in more detail below. In some embodiments, processor 706 is configured to execute the entropy estimator 716 to estimate a Shannon entropy associated with the output data 302, as is described in more detail below. In some embodiments, the processor 706 is configured to execute the entropy estimator 716 to estimate a collision entropy associated with the output data 302, as is described in more detail below. The entropy estimator 716 may be an executable code module.

The random number generator analyzer 714 comprises a probability estimator 718. The processor 706 is configured to execute the probability estimator 718 to solve an estimate function that relates an argument parameter (θ) to the entropy estimate, to determine a value for the argument parameter (θ), as is disclosed in more detail below. The probability estimator 718 may be an executable code module.

The random number generator analyzer 714 comprises a randomness estimator 720. The processor 706 is configured to execute the randomness estimator 720 to determine a randomness estimate of the entropy source 704, and to tune the randomness estimate, as is disclosed in more detail below. That is, the processor 706 is configured to execute the randomness estimator 720 estimate the randomness of the entropy source 704, and to tune the estimated randomness. The randomness estimator 720 may be an executable code module. In some embodiments, the randomness estimator 720 may be considered a min-entropy estimator.

The computer system 702 is configured to be in communication with the entropy source 704 using a network 710. The computer system 702 comprises a network interface 712. The network interface 712 enables the computer system 702 to communicate with the entropy source 704 using the network 710. The network interface 712 may comprise a combination of network interface hardware and network interface software suitable for establishing, maintaining and facilitating communication over a relevant communication channel of the network 710. Examples of a suitable network 710 include a cloud server network, wired or wireless internet connection, Bluetooth™ or other near field radio communication, and/or physical media such as USB.

In some embodiments, the entropy source 704 stores the output data 302 locally. The output data 302 can be stored as an aggregated data file comprising the outputs 301 generated by the entropy source 704. In some embodiments, the computer system 702 is configured to receive the output data 302 directly from the entropy source 704. For example, the entropy source 704 may provide the aggregated data file to the computer system 702 using the network 710. The computer system 702 may then store the output data 302 locally, for example, in the memory 708. The processor 706 may receive the output data 305 from the memory 708 for processing, as described in more detail below.

Alternatively, the entropy source 704 may provide the output data 302 to the computer system 702 as it generates the output data 302. For example, the entropy source 704 may provide each of the plurality of outputs 301 generated to the computer system 702 as they are generated. The processor 706 may receive the output data 302 from the entropy source 704 for processing, as described in more detail below. The processor 706 may receive the output data 302 from the entropy source 704 in real time. Alternatively, the computer system 702 may receive the output data 302 and store the output data 302 locally, for example, in the memory 708. The processor 706 may then receive the output data 305 from the memory 708 for processing, as described in more detail below.

It is to be understood that any receiving step may be preceded by the processor 706 determining or computing the data that is received.

Although the computer system 702 is illustrated in FIG. 7 to be in communication with the entropy source 704 using the network 710, it will be appreciated that in some embodiments, the computer system 702 may comprise the entropy source 704. For example, the entropy source 704 may be in the form of program code stored in the memory 708 that is executable by the processor 706 to generate the output data 302. The output data 302 may then also be stored in the memory 708 for processing.

In some embodiments, the computer system 702 is not in communication with the entropy source 704. Rather, the computer system 702 may be in communication with a database (not shown) that comprises the output data 302. The output data 302 may have been previously generated by the entropy source 704 and stored in the database. The computer system 702 may be in communication with the database using the network 710, and may receive the output data 302 from the database.

While FIG. 7 illustrates a particular computer system 702, it is noted that the methods described herein can be applied to the output data 302 produced by the entropy source 704 by computer systems of other forms. In some examples, the methods may be implemented in software that is accessible from around the world over the Internet.

First Method of Estimating Randomness of an Entropy Source

Figure 8:
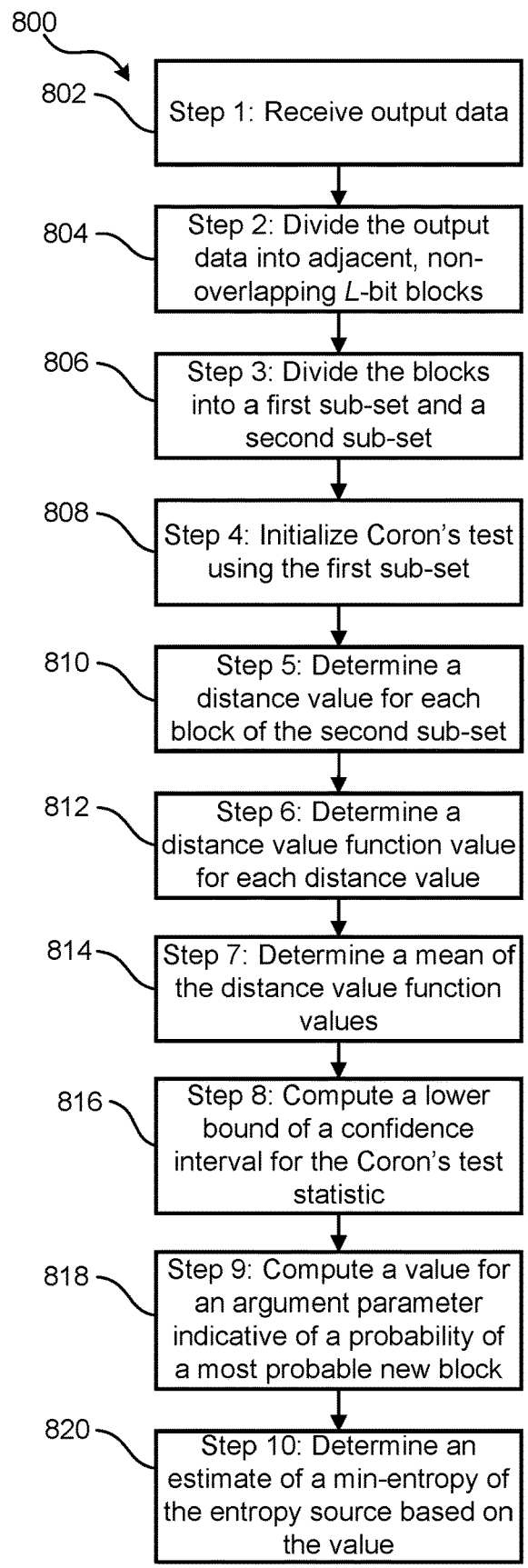
FIG. 8 is a block diagram illustrating a method of estimating randomness of an entropy source, according to an embodiment.

FIG. 8 illustrates a computer-implemented method 800 as performed by the processor 706 for estimating randomness of an entropy source 704. The entropy source 704 is in the form of a random number generator. The method 800 may therefore be referred to as a method of estimating randomness of a random number generator. The entropy source 704 may be a binary random number generator. FIG. 8 is to be understood as a blueprint for a software program and may be implemented step-by-step, such that each step in FIG. 8 is represented by a function in a programming language, such as C++ or Java. The resulting source code is then compiled and stored as computer executable instructions on memory 708 or implemented in a different computer environment.

At step 1, 802, the processor 706 receives output data 302 generated by the entropy source 704. The output data 302 may be considered input data for the method 800. The output data 302 may be represented as $s=(s_1, \ldots, s_N)$ where $s_1$ to $s_N$ are the outputs 301. The output data 302 is N-bit output data. As previously described, FIG. 3 illustrates an example of the output data 302 that may be generated by the entropy source 704.

At step 2, 804, the processor 706 divides the output data 302 into blocks 310 of a length L. The blocks 310 may be considered L-bit blocks. In particular, the processor 706 divides the output data 302 into adjacent, non-overlapping blocks of the length L. As previously described, FIG. 3 illustrates the output data 302 divided into adjacent, non-overlapping blocks 310 of the length L. Each block 310 is therefore an L-bit block 310 that comprises a data sequence, as previously described.

At step 3, 806, the processor 706 divides the blocks 310 into a first sub-set 402 and a second sub-set 404. As previously described, FIG. 4 illustrates the output data 302 divided into the first sub-set 402 and the second sub-set 404. The first sub-set 402 comprises a number Q of blocks 310. The first sub-set 402 therefore comprises a first sub-set first block 406, a plurality of first sub-set intermediate blocks 408 and a first sub-set last block 410. The first sub-set last block 410 may be considered a Qth block. The number Q of blocks of the first sub-set 402 can be relatively large. For example, the number Q of blocks of the first sub-set 402 can be $10 \times 2^L$. The second sub-set 404 comprises a number K of blocks 310. The second sub-set 404 therefore comprises a second sub-set first block 412, a plurality of second sub-set intermediate blocks 414 and a second sub-set last block 416. The second sub-set first block 412 may be considered a (Q+1)th block 412. The second sub-set last block 416 may be considered a (Q+K)th block 416. Therefore:

$$m = Q + K$$

And:

$$N = (Q+K) \times L$$

Estimating a Shannon Entropy of the Entropy Source

At steps 4 to 7, 808 to 814, the processor 706 estimates a Shannon entropy of the entropy source 704. In particular, the processor 706 estimates a Shannon entropy of the second sub-set 404 of the blocks 310, which may correspond with an estimate of a Shannon entropy of the entropy source 704. The processor 706 uses the first sub-set 402 of the blocks 310 to initialize the estimation. The processor 706 computes a Coron's test statistic $f_C(s)$ for the output data 302. Computing the Coron's statistic $f_C(s)$ may be referred to as performing Coron's test on the output data 302. An expected value of the Coron's test statistic may be referred to as E ($f_C(s)$). The processor 706 may compute the Coron's test statistic as may be described in J.-S. Coron, *"On the security of random sources,"* in *Proc. Int. Workshop Public Key Cryptography*. Berlin, Heidelberg: Springer Berlin Heidelberg, March 1999, pp. 29-42, the content of which is incorporated by reference in its entirety. The content of W. Killmann and W. Schindler, *A proposal for: Functionality classes for random number generators, German Federal Office for Information Security (BSI) Std., Rev.* 2, September 2011, is also incorporated by reference in its entirety.

Coron modified the Maurer's test function to define a Coron's test function as follows:

$$f_C(s) = \frac{1}{K} \sum_{n=Q+1}^{Q+K} g_C(D_n(s)) \quad (2)$$

Where $D_n(s)$ is a distance value as described below, $g_C(D_n(s))$ is a distance value function value corresponding to a respective distance value $D_n(s)$, and a distance value function $g_C(i)$, is chosen to satisfy a condition equating an expected value of the Coron's test parameter $f_C(S)$ to a Shannon entropy of the blocks 310 of the second sub-set 404 (i.e. $E(f_C(s))=H(B)$), where $H(B)$ is a Shannon entropy of the blocks 310 of the second sub-set 404.

The mean of $f_C(s)$ for s is given by:

$$E(f_C(s)) = \sum_{i=1}^{\infty} P(D_n(s) = i) \cdot g_C(i) \quad (3)$$

$$P(D_n(s)) =$$
$$\sum_{b \in [0,B-1]} P(b_n = b, b_{n-1} \neq b, \ldots, b_{n-i+1} \neq b, b_{n-1} = b) =$$
$$\sum_{b \in [0,B-1]} p_b^2 \times (1 - p_b)^{i-1}$$

Where $p_b = P(b)$ for $b \in [0,B-1]$ and $B = 2^L$. This follows from an assumption that the blocks 310, $b(s)=(b_1, \ldots, b_{Q+K})$, are statistically independent and identically distributed. By (2) and (3), the following is obtained:

$$E(f_C(s)) = \sum_{b \in [0,B-1]} P_b \gamma_C(p_b) \quad (4)$$

Where:

$$\gamma_C(x) = x \sum_{i=1}^{\infty} (1-x)^{i-1} g_C(i)$$

In order to satisfy $E(f_C(s))=H(B)$, the following equation should be solved:

$$\gamma_C(x) = -\log_2 x \quad (5)$$

By (4) and (5), it can be shown that:

$$g_C(i) = \frac{1}{\ln 2} \sum_{k=1}^{i-1} \frac{1}{k}.$$

Where $g_C(i)$ is the distance value function.

At step 4, 808, the processor 706 initializes Coron's test using the first sub-set 402. That is, the blocks 310 of the first sub-set 402 are used as reference blocks that provide initial positions in the output data 302 for each data sequence of each block 310 of the first sub-set 402. The initial positions, which correspond to the respective block numbers, of each data sequence in the first sub-set 402 may be stored as initialization data that comprises the block number that is associated with a respective data sequence, for example, as described with reference to the computer system that executes step 4, 208 of the method 200.

At step 5, 810, the processor 706 determines a distance value $D_n(s)$ for each block 310 of the second sub-set 402. The distance value $D_n(s)$ of each block 310 of the second sub-set 402 is indicative of a number of blocks 310 separating the respective block 310 from a closest previous instance of that block 310. That is, the distance value $D_n(s)$ of a particular block 310 that comprises a particular data sequence indicates a number of blocks 310 separating that block 310 from the most recent previous block 310 that comprises the same data sequence. Where there is no previous instance of the block 310, the processor 706 sets the relevant distance value $D_n(s)$ to a value equal to n (i.e. the relevant block number).

The distance values $D_n(s)$ are therefore given by:

$$D_n(s) = \begin{cases} n, & \text{if } \forall\, i < n, b_{n-i} \neq b_n, \\ \min\{i : i \geq 1, b_n = b_{n-i}\}, & \text{otherwise.} \end{cases}$$

Where, as previously described, $b_n$ is the block 310 under consideration.

As previously described, FIG. 5 illustrates a table 502 comprising distance values $D_n(s)$, 504 that have been determined for a data set s, 506. The distance values $D_n(s)$, 504 of the table 502 are determined in accordance with step 5, 810 of the method 800. The data set s, 506 may be a sub-set of the output data 302 generated by the entropy source 704. For example, the data set s, 506 may be the second sub-set 404 or a portion of the second sub-set 404.

At step 6, 812, the processor 706 determines a distance value function value $g_C(D_n(S))$ for each distance value $D_n(s)$. Each distance value function value $g_C(D_n(s))$ is determined by computing the distance value function $g_C(q)$ for each distance value $D_n(s)$:

$$g_C(D_n(s)) = \frac{1}{\ln 2} \sum_{k=1}^{D_n(s)-1} \frac{1}{k}.$$

In other words, the processor 706 solves the distance value function $g_C(i)$ using each distance value $D_n(s)$ to determine a distance value function value $g_C(D_n(s))$ for each block 310 of the second sub-set 404. As previously described, the distance value function $g_C(i)$ was chosen such that the expected value $E(f_C(s))$ of the Coron's test statistic $f_C(s)$ is equal to the Shannon entropy $H(B)$ of the blocks 310 of the second sub-set 404.

At step 7, 814, the processor 706 determines a mean of the distance value function values $g_C(D_n(s))$. The mean of the distance value function values $g_C(D_n(s))$ is the Coron's test statistic $f_C(s)$. As previously described, the Coron's test statistic $f_C(s)$ is determined by computing:

$$f_C(s) = \frac{1}{K} \sum_{n=Q+1}^{Q+K} g_C(D_n(s))$$

At step 8, 816, the processor 706 computes a lower bound of a confidence interval for the Coron's test statistic $f_C(s)$. The processor 706 sets X to a value equal to the Coron's test statistic $f_C(s)$ (i.e. $X=f_C(s)$), where X is a random variable. The processor 706 calculates a standard deviation $\hat{\sigma}$ of the random variable X, where the distance value function values $g_C(D_n(s))$ are instances of the random variable X. In other words, the processor 706 computes the standard deviation $\hat{\sigma}$ of the Coron's test statistic $f_C(s)$, where the distance value function values $g_C(D_n(s))$ are instances of the Coron's test statistic $f_C(s)$. This may be considered to be a standard deviation associated with the distance value function values $g_C(D_n(s))$. The processor 706 therefore calculates a variance of the random variable X (i.e. a variance of the Coron's test statistic $f_C(s)$), where the distance value function values $g_C(D_n(s))$ are instances of the random variable X. That is, the processor 706 computes $\hat{\sigma}=c\sqrt{\text{Var}(g_C(D_n(s)))}$. c is a corrective factor by which the standard deviation $\hat{\sigma}$ is reduced compared to what it would have been if the distance values $D_n(s)$ were statistically independent.

The processor 706 computes the lower bound X' of the confidence interval for the Coron's test statistic $f_C(s)$, by computing $$X' = X - \frac{2.576\hat{\sigma}}{\sqrt{K}}.$$

The constant 2.576 corresponds to a confidence interval of 99%. It will be appreciated however, that this number may be tuned in alternative calculations where a different confidence interval is desired. The lower bound X' of the confidence interval for the Coron's test statistic $f_C(s)$ is an estimate of the expected value of the Coron's test statistic E $(f_C(s))$.

It should be noted that the expected value of the Coron's test statistic is an estimate of the Shannon entropy of the blocks 310 of the second sub-set 404, i.e. $E(f_C(s))=H(B)$ due to the chosen distance value function $g_C(i)$, as detailed above. As the lower bound X' of the confidence interval for the Coron's test statistic $f_C(s)$ is an estimate of the expected value of the Coron's test statistic $E(f_C(s))$, it is also an estimate of the Shannon entropy H(B) of the blocks 310 of the second sub-set 404. Therefore, X'=H(B). Thus, by determining the lower bound X' of the confidence interval for the Coron's test statistic $f_C(s)$, the processor 706 estimates the Shannon entropy H(B) of the blocks 310 of the second sub-set 404. This enables a significant reduction in the computational complexity of subsequent steps of the method 800.

In some embodiments, the processor 706 executes steps 1 to 8, 802 to 816 of the method 800 by executing the entropy estimator 716.

Estimating Randomness of the Entropy Source Based on the Estimate of the Shannon Entropy At step 9, 818, the processor 706 computes a value for an argument parameter $\theta$ that is indicative of a probability of a most probable block being generated as a new block by the entropy source 704. The processor 706 computes the value for the argument parameter $\theta$ by solving an estimate function that relates the argument parameter $\theta$ to the Shannon entropy estimate.

Fano's inequality relates a probability of error in guessing a random variable to its conditional entropy, as may be described in T. M. Cover and J. A. Thomas, *Elements of Information Theory*, 2nd ed. Hoboken, N.J.: Wiley-Interscience, 2006, the content of which is incorporated by reference in its entirety. Where a random variable, Y, is known, Fano's inequality relates a probability of error in guessing a random variable Z to its conditional entropy, i.e. H(Z|Y).

In the case of outputs provided by entropy sources (e.g. random number generators), a next output of the entropy source may be guessed without any definitive information. That is, the previous outputs of the entropy source are taken to be statistically independent from the next output. A best guess of the next output may therefore be an output that has most commonly occurred within the known outputs of the entropy source. The probability of the most likely output of the entropy source being generated by the entropy source as the next output can be referred to as a value of an argument parameter $\theta$. Fano's inequality can therefore be modified to:

$$h(\theta)+(1-\theta)\log_2(2^L-1) \geq H(B)$$

Where H(B) is a Shannon entropy, $h(\theta)$ is a binary entropy function:

$$h(\theta) = -\theta \log_2\theta - (1)\log_2(1-\theta)$$

And the argument parameter $\theta = \max_{b \in \{0,\ldots,2^L-1\}} p_b$. That is, the argument parameter $\theta$ is indicative of the probability of the most probable output of the entropy source 704 being generated as the next output. The near uniform distribution of:

$$P_\theta(b) = \begin{cases} \theta, & \text{if } b = 0, \\ \frac{1-\theta}{B-1}, & \text{otherwise.} \end{cases}$$

Achieves this bound with equality. $P_\theta(b)$ is indicative of a probability that particular block b will be generated as a new output of the entropy source.

For $$\theta \in \left[\frac{1}{B}, 1\right],$$

where $B=2^L$, there exists only one solution of the following equation:

$$h(\theta)+(1-\theta)\log_2(B-1)=H(B) \qquad (6)$$

The solution $\theta^*$ minimizes a min-entropy, i.e., $H^{(\infty)}(B) \geq -\log_2 \theta^*$.

This may be proven as follows. Suppose that $\zeta(\theta)=h(\theta)+(1-\theta)\log_2(B-1)$. For $$\theta \in \left(\frac{1}{B}, 1\right], \zeta(\theta)$$

is a strictly decreasing function, i.e., $\zeta(\theta)' < 0$. Also, $$\zeta\left(\frac{1}{B}\right) = \log_2 B$$

and $\zeta(1)=0$. Since $0 \leq H(B) \leq \log_2 B$, there exists only one solution $\theta^*$, which is the maximum value that satisfies (19). Hence, $H^{(\infty)}(B) = -\log_2 \theta \geq -\log_2 \theta^*$.

As the lower bound X' of the confidence interval for the Coron's test statistic $f_C(s)$ is an estimate of the expected value of the Coron's test statistic E ($f_C(s)$), and is also an estimate of the Shannon entropy H(B) of the blocks 310 of the second sub-set 404, one can substitute the lower bound X' of the confidence interval for the Coron's test statistic $f_C(s)$ for the Shannon entropy H(B) term in the equality case of the modified Fano's inequality (Equation 6). Doing so, and solving for the value of the argument parameter $\theta$ yields a value for the argument parameter $\theta$ indicative of the probability of the most probable block being generated by the entropy source 704 as a new block.

Therefore, at step 9, 818, the processor 706 solves for the value of the argument parameter $\theta$ of an estimate function. The estimate function is:

$$h(\theta) + (1-\theta)\log_2(B-1) = X'$$

The estimate function therefore relates the argument parameter $\theta$ to the estimated Shannon entropy H(B) of the second sub-set 404 of the blocks 310. The processor 706 solves for the value of the argument parameter $\theta$ using a bisection method (or a binary search method) over an interval $$\left[\frac{1}{B}, 1\right].$$

In some embodiments, the processor 706 executes step 9, 818 by executing the probability estimator 718.

At step 10, 820, the processor 706 determines an estimate of randomness of the entropy source 704 based on the value of the argument parameter $\theta$. In particular, the processor 706 determines an estimate of a min-entropy of the blocks 310 of the second sub-set 404. The processor 706 therefore determines an estimate of a randomness of the entropy source 704 as the estimate of the min-entropy of the blocks 310 of the second sub-set 404 corresponds to an estimate of randomness of the entropy source 704.

If there is no solution for the value of the argument parameter $\theta$, the estimate of the min-entropy of the entropy source is equal to 1. This may be because the output data 302 generated by the entropy source 704 is output according to a uniform distribution when there is no solution for the value of the argument parameter $\theta$.

Where there is a solution for value of the argument parameter $\theta$, the processor 706 determines the estimate of the min-entropy of the blocks 310 of the second sub-set 404 by computing:

$$H^{(\infty)}(b) = -\log_2 \theta$$

Where $H^{(\infty)}(b)$ is the estimate of the min-entropy of the blocks 310 of the second sub-set 404. This may be considered an estimate of randomness of the entropy source 704.

The processor 706 uses the length L to tune the estimate of randomness of the entropy source 604. In particular, the processor 706 uses the length L to tune the estimate of the min-entropy $H^{(\infty)}(b)$ of the blocks 310 of the second sub-set 404.

The processor 706 determines an estimate of a per-bit min-entropy of the entropy source 704 by dividing the estimate of the min-entropy $H^{(\infty)}(b)$ of the blocks 310 of the second sub-set 404 by the length L. Thus:

$$H^{(\infty)} \geq \begin{cases} -\dfrac{\log_2 \theta}{L}, \\ 1, \end{cases}$$

if the bisection method yields a solution, otherwise.

Where H(c) is an estimate of the per-bit min-entropy of the entropy source 704, $\theta$ is the value of the argument parameter $\theta$ determined at step 9, 818 and L is the length of the blocks 310. A conservative estimate of the min-entropy of the entropy source 704 may correspond with a lower bound of this inequality, such that:

$$H^{(\infty)} = -\frac{\log_2 \theta}{L}$$

Where $H^{(\infty)}$ is the relevant estimate of the min-entropy of the entropy source 704.

Determining the estimate of the min-entropy of the entropy source 704 using the estimate of the min-entropy of the blocks 310 of the second sub-set 404 and the length L may be considered to be tuning the estimate of the min-entropy of the blocks 310 of the second sub-set 404 using the length L. The tuned estimate of randomness of the entropy source 704 therefore corresponds to an estimate of a min-entropy of the entropy source 704.

The processor 706 may store the estimate of the min-entropy of the entropy source 704 in the memory 708.

In some embodiments, the processor 706 executes step 10, 820 by executing the randomness estimator 720.

Advantages Provided by the Method 800

The method 800 is an improved method for estimating randomness of entropy sources such as random number generators. The method 800 offers significant computational efficiencies when compared to the method 200, for example. The computational complexity of the method 800 is of the order S (i.e. O(S)), where S represents a number of iterations of the bisection method. That is, S may be, or may be proportional to a number of iterations performed when executing the bisection method to solve the estimate function. The computational complexity of the method 200 is of the order $SK^2$ (i.e. $O(SK^2)$). Because the computed expected value of the Coron's test statistic $f_C(s)$ is an estimate of the Shannon entropy H(B) of the blocks 310 of the second sub-set 404, the modified version of Fano's inequality may be used to determine the value for the argument parameter $\theta$, as described above. Solving for the value of the argument parameter $\theta$ using the estimate function based on the modified version of Fano's inequality is significantly less computationally complex than step 9, 218 of the method 200, which requires the computation of an estimate function comprising two summation operators. Thus, the method 800 provides for a comparable estimate of randomness of entropy sources, while offering a significant reduction in the time required to estimate the randomness of the entropy source, and the computing power required to do so. This significant advantage is enabled for every practical application of these entropy sources, by reducing the computational complexity of validating the relevant entropy source(s) prior to use, or during use. For example, where the relevant entropy source is used for cryptographic key generation, the method 800 provides a computationally efficient method of estimating randomness of the entropy source, and therefore validating the security of the keys generated by the entropy source.

Second Method of Estimating Randomness of an Entropy Source

Figure 9:
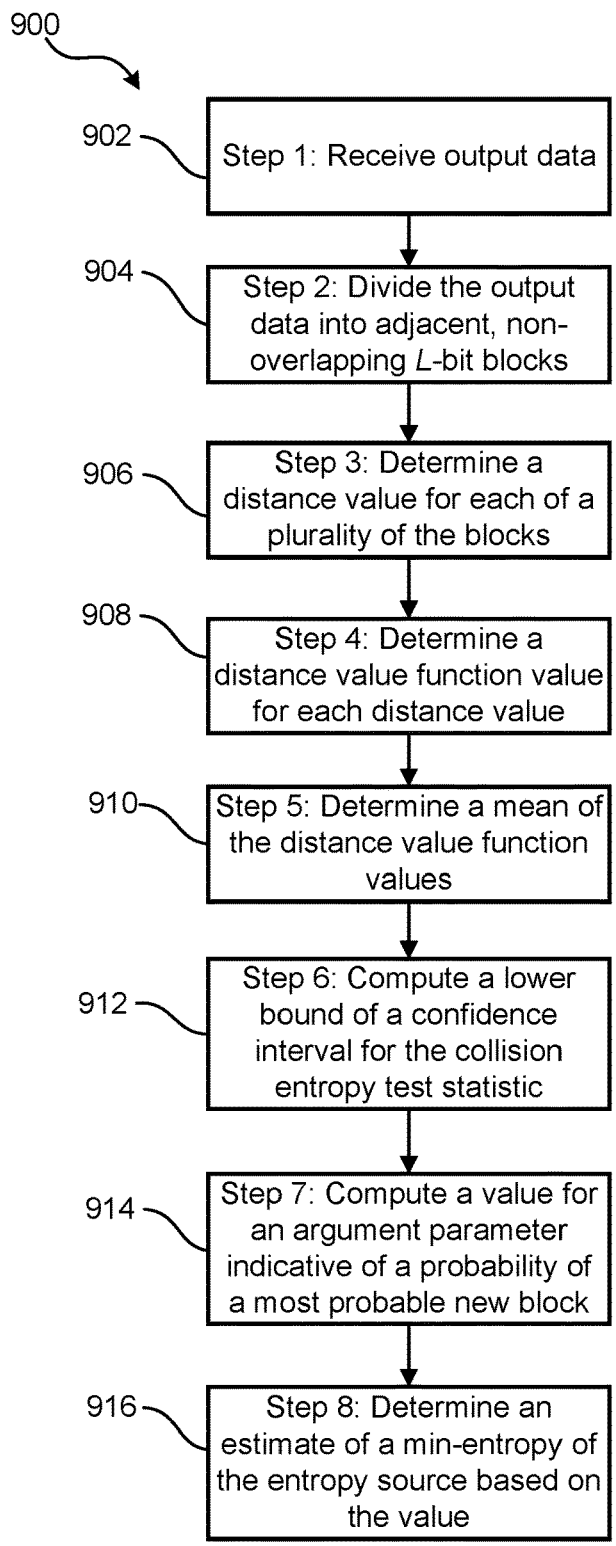
FIG. 9 is a block diagram illustrating another method of estimating randomness of an entropy source.

FIG. 9 illustrates a computer-implemented method 900 as performed by the processor 706 for estimating randomness of the entropy source 704. The entropy source 704 is in the form of a random number generator. The method 900 may therefore be referred to as a method of estimating randomness of a random number generator. The entropy source 704 may be a binary random number generator. FIG. 9 is to be understood as a blueprint for a software program and may be implemented step-by-step, such that each step in FIG. 9 is represented by a function in a programming language, such as C++ or Java. The resulting source code is then compiled and stored as computer executable instructions on memory 708 or implemented in a different computer environment At step 1, 902, the processor 706 receives output data 302 generated by the entropy source 704. The output data 302 may be considered input data for the method 800. The output data 302 may be represented as $s=(s_1, \ldots, s_N)$, where $s_1$ to $s_N$ are outputs 301. The output data 302 is N-bit output data. As previously described, FIG. 3 illustrates an example of output data 302 that may be generated by the entropy source 704.

At step 2, 904, the processor 706 divides the output data 302 into blocks 310 of a length L. The blocks 310 may be considered L-bit blocks. In particular, the processor 706 divides the output data 302 into adjacent, non-overlapping blocks of the length L. As previously described, FIG. 3 illustrates the output data 302 divided into adjacent, non-overlapping blocks 310 of the length L. The output data 302 comprise a first block 312, a plurality of intermediate blocks 314 and a last block 316. For the method 900, the processor 706 divides the output data 302 into a number K of blocks 310. The last block 316 may therefore be considered a Kth block. Each block 310 may have an associated block number corresponding to the number the respective block 310 takes in the output data 302. For example, the first block 312 may have an associated block number of 1. The last block 316 may have an associated block number of K. Where the number of outputs 301 does not evenly divide into blocks 310 of the length L, the processor 706 may truncate the remaining outputs 301. The processor 706 may divide the output data 302 into L-bit blocks, where L=6.

Each block 310 comprises a data sequence. For example, the data sequence of the first block 312 is [0, 1, 0, 0, 1, 0]. The data sequence of the last block 316 is [0, 1, 0, 0, 0, 1]. The data sequences of the first block 312 and the last block 316 are therefore different. The data sequences of two blocks 310 may be considered to be the same if the two blocks 310 comprise the same data sequence. That is, if each output 301 and order of each output 301 of one block 310 is the same as outputs 301 of a different block 310, the blocks 310 can be considered to comprise the same data sequence. Each of these blocks 310 may be considered an instance of that data sequence. For example, with reference to FIG. 3, the data sequences of blocks A, A' and A" are the same. The data sequences may be referred to as patterns.

Estimating a Collision Entropy of the Entropy Source

At steps 3 to 6, 906 to 912, the processor 706 computes an estimate of a collision of the entropy source 704. In particular, the processor 706 estimates a collision entropy of the blocks 310, which may correspond with an estimate of a collision entropy of the entropy source 704. The processor 706 computes a collision entropy test statistic $f_K(s)$ for the output data 302. Computing the collision entropy test statistic $f_K(s)$ may be referred to as performing Kim's test on the output data 302. An expected value of the collision entropy test statistic may be denoted as $E(f_K(s))$. The processor 706 may compute the collision entropy test statistic $f_K(s)$ as may be described in Y.-S. Kim, "*Low complexity estimation method of Renyi entropy for ergodic sources,*" *Entropy*, vol. 20, no. 9, pp. 1-14, August 2018, the content of which is incorporated by reference in its entirety.

A Renyi entropy of order a of the entropy source 704 is given by:

$$H^{(\alpha)}(B) = \frac{1}{1-\alpha} \log_2 \left( \sum_{b=0}^{B-1} p_b^\alpha \right).$$

Where $H^{(\alpha)}(B)$ is the Renyi entropy of order $\alpha$, $B=2^L$ and $p_b$ is a probability that a particular output 301 (i.e. an output 301 with a particular data sequence) is generated by the entropy source 704. A limiting value of the Renyi entropy $H^{(\alpha)}(B)$ as $\alpha \to 1$ is a Shannon entropy $H^{(1)}(B)$ of the entropy source 704. A limiting value of the of the Renyi entropy $H^{(\alpha)}(B)$ as $\alpha \to 2$ is a collision entropy $H^{(2)}(B)$ of the entropy source 704. That is, the collision entropy $H^{(2)}(B)$ is the case:

$$H^{(2)}(B) = -\log_2 \left( \sum_{b=0}^{B-1} p_b^2 \right).$$

If one supposes that $\theta' = \max_{b \in \{0, \ldots, 2^L-1\}} p_b$, $$\frac{1}{1-\alpha} \log_2 \left( \theta^\alpha + \frac{(1-\theta)^\alpha}{(B-1)^{\alpha-1}} \right) \geq H^{(\alpha)}(B) \tag{7}$$

For $\alpha > 1$. The near-uniform distribution of:

$$P_\theta(b) = \begin{cases} \theta, & \text{if } b = 0, \\ \frac{1-\theta}{B-1}, & \text{otherwise.} \end{cases}$$

Achieves this bound with equality, where $P_\theta(b)$ is indicative of a probability that particular block b will be generated as a new output of the entropy source.

Proof: Without loss of generality, suppose that $\theta = p_0$. For $\alpha > 1$, maximization of $H^{(\alpha)}(B)$ is equivalent to the following optimization problem:

$$\underset{(p_1, \ldots, p_{B-1})}{\text{minimize}} \quad \sum_{b=1}^{B-1} p_b^\alpha$$

$$\text{subject to} \quad \sum_{b=1}^{B-1} p_b = 1-\theta, \, p_b \geq 0, \, \forall \, b \in \{1, \ldots, B-1\}$$

This is a convex optimization problem because of $\alpha>1$ and $p_b \geq 0$. From Karush-Kuhn-Tucker (KKT) conditions, we obtain the optimal solution $$p_1^* = \ldots = p_{B-1}^* = \frac{1-\theta}{1-B},$$

i.e., the near-uniform distribution. The Renyi entropy becomes the left hand side of (7) for the near-uniform distribution.

For $$\theta \in \left[\frac{1}{B}, 1\right],$$

there exists only one solution of the follow equation:

$$\theta^\alpha + \frac{(1-\theta)^\alpha}{(B-1)^{\alpha-1}} = 2^{(1-\alpha)H^{(\alpha)}(B)}. \tag{8}$$

The solution minimizes the min-entropy, i.e. $H^{(\infty)}(B) \geq -\log_2 \theta$.

This may be proven as follows. Suppose that $$\zeta(\theta) = \theta^\alpha + \frac{(1-\theta)^\alpha}{(B-1)^{\alpha-1}}. \text{ For } \theta \in \left(\frac{1}{B}, 1\right],$$

$\zeta(\theta)$ is a strictly increasing function, i.e., $\zeta(\theta)' > 0$. Also, $$\zeta\left(\frac{1}{B}\right) = B^{1-\alpha}$$

and $\zeta(1)=1$. Since $0 \leq H^{(\alpha)}(B) \leq \log_2 B$, we observe that $B^{1-\alpha} \leq 2^{(1-\alpha)H^{(\alpha)}(B)} \leq 1$. Hence, there exists only one solution $\theta^*$, which is the maximum value that satisfies (7). Hence, $H^{(\alpha)}(B) = -\log_2 \theta \geq -\log_2 \theta^*$.

For $\alpha=2$, the solution of (8) can be obtained as a closed-form.

For a given collision entropy $H^{(2)}(B)$, the min-entropy is lower bounded as follows:

$$H^{(\infty)}(B) \geq -\log_2 \theta^{(2)}$$

Where:

$$\theta^{(2)} = \frac{1 + \sqrt{(B-1)(B \cdot 2^{-H^{(2)}(B)} - 1)}}{B}. \tag{9}$$

This may be proven as follows. From (8) and $\alpha=2$, we derive $$\theta^{(2)} = \frac{1 \pm \sqrt{(B-1)(B \cdot 2^{-H^{(2)}(B)} - 1)}}{B}. \text{ Since } \frac{1}{B} \leq \theta^{(2)} \leq 1,$$

we obtain (9).

Suppose that $\theta^{(\alpha)}$ and $\theta^{(\alpha+1)}$ are estimated values from $H^{(\alpha)}(B)$ and $H^{(\alpha+1)}(B)$ respectively. If $$\theta^{(\alpha)} \gg \frac{1}{1 + (B-1)^{\frac{\alpha-1}{\alpha}}},$$

then:

$$H^{(\infty)} \geq -\frac{\log_2 \theta^{(\alpha+1)}}{L} \geq -\frac{\log_2 \theta^{(\alpha)}}{L} \tag{10}$$

For $\alpha>1$. Hence, the estimated lower bounds on the min-entropy improve with the order $\alpha>1$ for a large B.

It can be shown that $$\theta^{(\alpha)} \geq \theta^{(\alpha+1)} \theta^{(\alpha)} \gg \frac{1}{1 + (B-1)^{\frac{\alpha-1}{\alpha}}},$$

which is equivalent to (10). For convenience, suppose that $x=\theta^{(\alpha)}$ and $y=\theta^{(\alpha+1)}$.

Referring to C. Beck, "*Upper and lower bounds on the Renyi dimensions and the uniformity of multifractals,*" *Physica D*, vol. 41, no. 1, pp. 67-78, January-February 1990, it was shown that $$\frac{\alpha-1}{\alpha} H^{(\alpha)} \leq \frac{\beta-1}{\beta} H^{(\beta)}$$

for $\beta>\alpha$ and $\alpha\beta>0$. The content of C. Beck, "*Upper and lower bounds on the Renyi dimensions and the uniformity of multifractals,*" *Physica D*, vol. 41, no. 1, pp. 67-78, January-February 1990 is incorporated by reference in its entirety.

If $\beta=\alpha+1$ and $\alpha>1$, then:

$$H^{(\alpha)}(B) \leq \frac{\alpha^2}{\alpha^2 - 1} H^{(\alpha+1)}(B) \tag{11}$$

By (11), we obtain the following inequality for the near-uniform distribution:

$$\frac{1}{1-\alpha} \log_2\left(x^\alpha + \frac{(1-x)^\alpha}{(B-1)^{\alpha-1}}\right) \leq \frac{\alpha}{1-\alpha^2} \log_2\left(y^{\alpha+1} + \frac{(1-y)^{\alpha+1}}{(B-1)^\alpha}\right),$$

Which is equivalent to:

$$\left(x^\alpha + \frac{(1-x)^\alpha}{(B-1)^{\alpha-1}}\right)^{\frac{1}{\alpha}} \geq \left(y^{\alpha+1} + \frac{(1-y)^{\alpha+1}}{(B-1)^\alpha}\right)^{\frac{1}{\alpha+1}}. \tag{12}$$

If $$x^\alpha \gg \frac{(1-x)^\alpha}{(B-1)^{\alpha-1}} \text{ and } y^{\alpha+1} \gg \frac{(1-x)^{\alpha+1}}{(B-1)^\alpha}$$

then (12) becomes x≥y. Hence, $$\theta^{(a)} \geq \theta^{(a+1)}\theta^{(a)} \gg \frac{1}{1+(B-1)^{\frac{a-1}{a}}}.$$

A collision entropy test function (which may also be referred to as a Renyi entropy test function) is as follows:

$$f_K(s) = \frac{1}{K}\sum_{n=1}^{K} g_K(D_n(s))$$

Where $f_K(s)$ is a collision entropy test statistic, $D_n(s)$ is a distance value as described below, $g_K(i)$ is a distance value function and $g_K(D_n(s))$ is a distance value function value. The distance value function $g_K(i)$ is:

$$g_K(i) = \begin{cases} 1, & \text{if } i = 1, \\ 0, & \text{otherwise.} \end{cases}$$

Each distance value function value $g_K(D_n(s))$ is therefore determined by computing, for each distance value $D_n(s)$:

$$g_k(D_n(s)) = \begin{cases} 1, & \text{if } D_n(s) = 1, \\ 0, & \text{otherwise.} \end{cases}$$

At step 3, 906, the processor 706 determines a distance value $D_n(s)$ for a plurality of the blocks 310 of the output data 302. The processor 706 may determine a distance value $D_n(s)$ for each block 310 of the output data 302. The processor 706 therefore determines K distance values $D_n(s)$. The processor 706 may determine a distance value $D_n(s)$ for each block 310 of the output data 302 except for the first block 312. The first block 312 may be said to initialize the test.

The distance value $D_n(s)$ of each block 310 is indicative of a number of blocks 310 separating the respective block from a closest previous instance of that block 310. That is, the distance value $D_n(s)$ of a particular block 310 that comprises a particular data sequence indicates a number of blocks 310 separating that block 310 from the most recent previous block 310 that comprises the same data sequence. Where there is no previous instance of the block 310, the processor 706 sets a value of the relevant distance value $D_n(s)$ to equal n (i.e. the number of the block 310).

The distance values $D_n(s)$ may therefore be given by:

$$D_n(s) = \begin{cases} n, & \text{if } \forall\, i < n,\, b_{n-i} \neq b_n, \\ \min\{i : i \geq 1,\, b_n = b_{n-i}\}, & \text{otherwise.} \end{cases}$$

Where, as previously described, $b_n$ is the block 310 under consideration.

As previously described, FIG. 5 illustrates a table 502 comprising distance values $D_n(s)$, 504 that have been determined for a data set s, 506. The distance values $D_n(s)$, 504 of the table 502 are determined in accordance with step 3, 906 of the method 900. The data set s, 506 may be part of the output data 302 generated by the entropy source 704. The data set s, 506 and the distance values $D_n(s)$, 504 may be determined by the processor 706, as described above.

At step 4, 908, the processor 706 determines a distance value function value $g_K(D_n(s))$ for each distance value $D_n(s)$. Each distance value function value $g_K(D_n(s))$ is determined by computing the distance value function $g_K(i)$ for each distance value $D_n(s)$:

$$g_k(D_n(s)) = \begin{cases} 1, & \text{if } D_n(s) = 1, \\ 0, & \text{otherwise.} \end{cases}$$

In other words, the processor 706 solves the distance value function $g_K(i)$ using the distance values $D_n(s)$ to determine a distance value function value $g_C(D_n(s))$ for the relevant blocks 310. The distance value function value $g_K(D_n(s))$ is equal to 1 for a respective block 310 if the previous block 310 generated by the entropy source 704 comprises the same data sequence as the respective block 310. The distance value function value $g_K(i)$ is equal to 0 for a respective block 310 if the previous block 310 generated by the entropy source 704 comprises a different data sequence than the respective block 310.

At step 5, 910, the processor 706 determines a mean of the distance value function values $g_K(D_n(s))$. The mean of the distance value function values $g_K(D_n(s))$ is the collision entropy test statistic $f_K(s)$. As previously described, the collision entropy test statistic $f_K(s)$ is determined by computing:

$$f_k(s) = \frac{1}{K}\sum_{n1}^{K} g_K(D_n(s))$$

At step 6, 912, the processor 706 computes a lower bound of a confidence interval for the collision entropy test statistic $f_K(s)$. The processor 706 sets X to equal a value equal to the collision entropy test statistic $f_K(s)$, where X is a random variable. The processor 706 calculates a standard deviation $\hat{\sigma}$ of the random variable X, where the distance value function values $g_K(D_n(s))$ are instances of the random variable X. In other words, the processor 706 computes the standard deviation $\hat{\sigma}$ of the collision entropy test statistic $f_K(s)$, where the distance value function values $g_K(D_n(s))$ are instances of the collision entropy test statistic $f_K(s)$. This may be considered to be a standard deviation associated with the distance value function values $g_K(D_n(s))$. The processor 706 therefore calculates a variance of the random variable X (i.e. the collision entropy test statistic $f_K(s)$), where the distance value function values $g_K(D_n(s))$ are instances of the random variable X. The processor 706 uses the calculated variance to compute the standard deviation $\hat{\sigma}$. The processor 706 computes the standard deviation $\hat{\sigma}$ by computing $\hat{\sigma} = c\sqrt{\mathrm{Var}(g_K(D_n(s)))}$. c is a corrective factor by which the standard deviation $\hat{\sigma}$ is reduced compared to what it would have been if the distance values $D_n(s)$ were statistically independent.

The processor 706 computes the lower bound X' of the confidence interval for the collision entropy test statistic $f_K(s)$, by computing $$X' = X - \frac{2.576\hat{\sigma}}{\sqrt{K}}.$$

The constant 2.576 corresponds to a confidence interval of 99%. It will be appreciated however, that this number may be tuned in alternative calculations where a different confidence interval is considered. The lower bound X' of the confidence interval for the collision entropy test statistic $f_K(s)$ is used as a conservative estimate of the expected value of the collision entropy test statistic E $(f_K(s))$.

The expected value of the collision entropy test statistic E $(f_K(s))$ is an estimate of a collision entropy of the blocks 310, i.e. E$(f_K(s))$=H$^{(2)}$(B). As the lower bound X' of the confidence interval for the collision entropy test statistic $f_K(s)$ is an estimate of the expected value of the collision entropy test statistic E $(f_K(s))$, it is also an estimate of the collision entropy of the blocks 310. Therefore, X'=H$^{(2)}$(B). This enables a significant reduction in the computational complexity of subsequent steps of the method 900.

The processor 706 may execute steps 1 to 6, 902 to 912 of the method 900 by executing the entropy estimator 716.

At step 7, 914, the processor 706 computes a value for an argument parameter $\theta^{(2)}$ that is indicative of a probability of a most probable block being generated as a new block by the entropy source 704. The processor 706 computes the value for the argument parameter $\theta^{(2)}$ by solving a closed form estimate function that relates the argument parameter $\theta^{(2)}$ to the estimate of the collision entropy of the blocks 310.

The processor 706 solves for the value of the argument parameter $\theta^{(2)}$ of the closed form estimate function:

$$\theta^{(2)} = \frac{1 + \sqrt{(B-1)(B \cdot 2^{-X'} - 1)}}{B}.$$

Where B=$2^L$.

The estimate function may alternatively be expressed:

$$\theta^{(2)} = \frac{1 + \sqrt{(2^L - 1)(2^{L-X'} - 1)}}{2^L}$$

The estimate function therefore relates the argument parameter $\theta^{(2)}$ to the estimated collision entropy of the blocks 310, and therefore the estimated collision entropy of the entropy source 704.

The processor 706 may execute step 7, 914 by executing the probability estimator 718.

Estimating Randomness of the Entropy Source Based on the Estimate of the Collision Entropy At step 8, 916, the processor 706 determines an estimate of randomness of the entropy source 704 based on the value of the argument parameter $\theta^{(2)}$. In particular, the processor 706 determines an estimate of a min-entropy of the blocks 310. The processor 706 therefore determines an estimate of a randomness of the entropy source 704, as the estimate of the min-entropy of the blocks 310 corresponds to an estimate of a randomness of the entropy source 704.

The processor 706 determines the estimate of the min-entropy of the blocks 310 by computing:

$$H^{(\infty)}(b) = -\log_2 \theta^{(2)}$$

Where H$^{(\infty)}$(b) is the estimate of the min-entropy of the blocks 310. This may be considered a randomness estimate of the entropy source 704.

The processor 706 uses the length L to tune the estimate of randomness of the entropy source 704. In particular, the processor 706 uses the length L to tune the estimate of the min-entropy of the blocks 310.

The processor 706 determines an estimate of a per-bit min-entropy of the entropy source 704 by dividing the estimate of the min-entropy of the blocks 310 by the length L. Thus:

$$H^{(\infty)} = -\frac{\log_2 \theta^{(2)}}{L}$$

Where H$^{(\infty)}$ is an estimate of the per-bit min-entropy of the entropy source 704, $\theta^{(2)}$ is the value of the argument parameter $\theta^{(2)}$ determined at step 7, 914 and L is the length of the blocks 310.

Determining the estimate of the min-entropy of the entropy source 704 using the estimate of the min-entropy of the blocks 310 and the length L may be considered to be tuning the estimate of the min-entropy of the blocks 310 using the length L.

The processor 706 may execute step 8, 916 by executing the randomness estimator 720.

Advantages Provided by the Method 900

The method 900 is an improved method for estimating randomness of entropy sources such as random number generators. The method 900 offers significant computational efficiencies when compared to the method 200, for example. The computational complexity of the method 900 is of the order 1 (i.e. 0(1)), whereas the computational complexity of the method 200 is of the order SK$^2$ (i.e. 0(SK$^2$)) where S represents a number of iterations of the bisection method. That is, S may be, or may be proportional to a number of iterations performed when executing the bisection method to solve the estimate function. The estimate function of the method 900 is a closed-form equation. This is enabled, as detailed above, by the relationship between the collision entropy and the value for the argument parameter $\theta(^2)$. Solving for the argument parameter $\theta(^2)$ using the closed form estimate function is significantly less computationally complex than step 9, 218 of the method 200, which requires the computation of a non-closed form estimate function comprising two summation operators.

Determining the estimate of the min-entropy of the entropy source 704 using the collision entropy provides for a more accurate min-entropy estimate, as is detailed above. Thus, the method 900 provides for an improved estimate of randomness of an entropy source, while offering a significant reduction in the time required to estimate the randomness of the entropy source, and the computing power required to do so. This significant advantage is enabled for every practical application of these entropy sources, by reducing the computational complexity of validating the relevant entropy source(s) prior to use, or during use. For example, where the relevant entropy source is used for cryptographic key generation, the method 800 provides a computationally efficient method of estimating randomness of the entropy source, and therefore validating the security of the keys generated by the entropy source.

The method 900 can be an online method for estimating randomness of entropy sources such as random number generators. That is, as the relevant entropy source generates additional outputs, the collision entropy test statistic $f_K(s)$ can be updated dynamically to take the additional outputs into consideration. Therefore, the min-entropy estimate provided by the method 900 can be updated as additional outputs are received from the entropy source. This advantageous functionality is enabled, at least in part, because the estimate function used to determine the argument parameter $\theta^{(2)}$ is closed form. The estimate function can therefore be readily recomputed as additional outputs are received from the entropy source to update the estimated min-entropy. The method 200 is not an online method. The method 200 computes the value for the argument parameter θ by solving a non-closed form equation. Thus, the method 200 cannot be performed in an online way. That is, the estimate of the min-entropy of the entropy source provided by method 200 cannot be updated to take additional outputs into consideration. The method 200 can only be performed using "batches" of output data. Again, this provides significant practical advantages for every practical application of entropy sources, as the randomness of the relevant entropy source can be validated, and the validation can be maintained as new outputs are generated. For example, where the relevant entropy source is used for cryptographic key generation, the method 900 can constantly assess randomness of the keys generated by the entropy source as new keys are generated. This can allow for online, real-time validation of the keys generated by the entropy source.

On-Line Estimator Based on Collision Entropy

Figure 10:
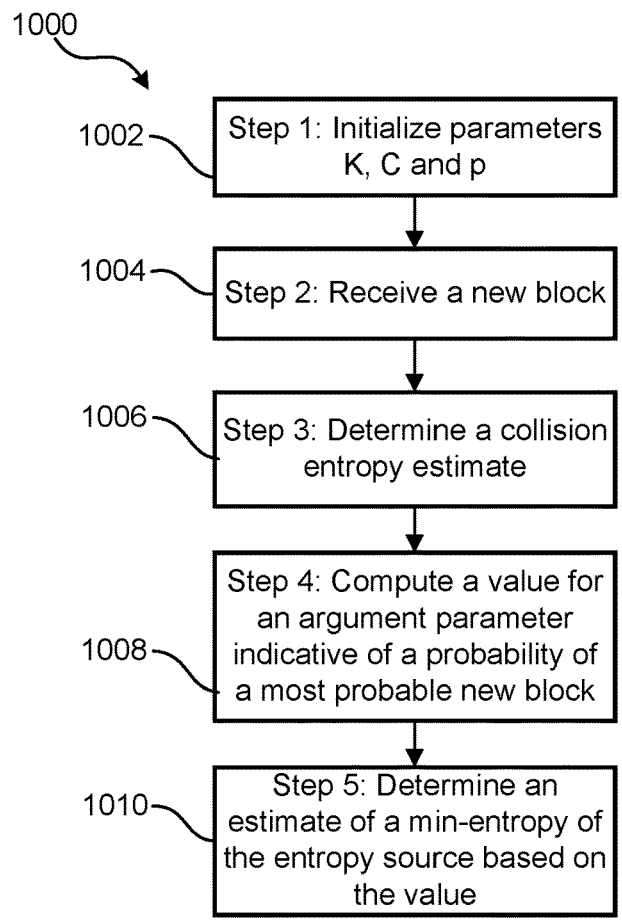
FIG. 10 is a block diagram illustrating another method of estimating randomness of an entropy source.

FIG. 10 illustrates a computer-implemented method 1000 as performed by the processor 706 for estimating randomness of the entropy source 704. The entropy source 704 is in the form of a binary random number generator. The method 1000 may therefore be referred to as a method of estimating randomness of a random number generator. FIG. 10 is to be understood as a blueprint for a software program and may be implemented step-by-step, such that each step in FIG. 10 is represented by a function in a programming language, such as C++ or Java. The resulting source code is then compiled and stored as computer executable instructions on memory 708 or implemented in a different computer environment.

Figure 11:
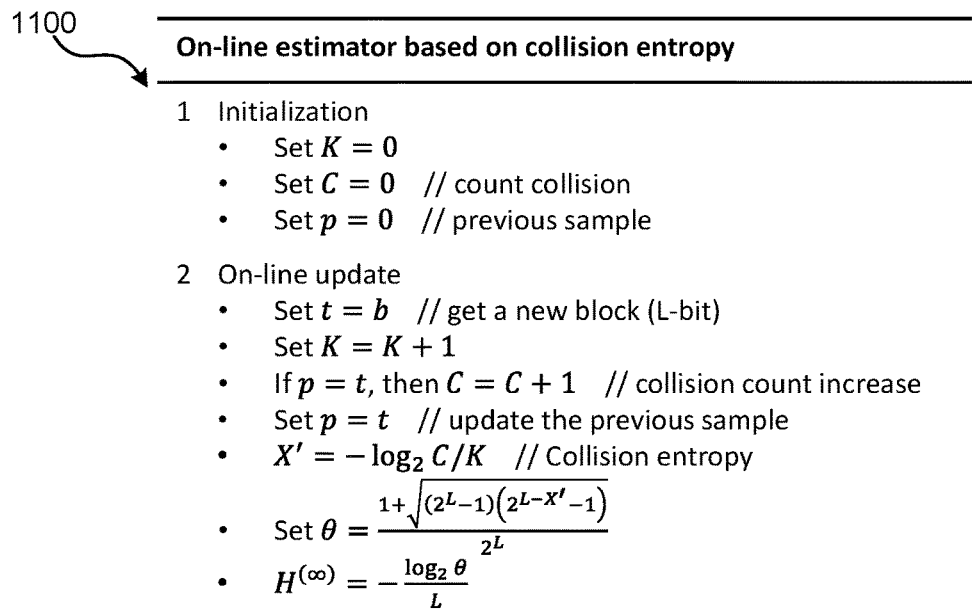
FIG. 11 illustrates pseudo-code associated with the method of FIG. 10.

The method 1000 is based on a determination of an estimate of a collision entropy of the entropy source 704, as described with reference to the method 900. The method 1000 is an online method. That is, the method 1000 updates the estimate of randomness of the entropy source 704 as new outputs are generated by the entropy source 704. FIG. 11 illustrates a pseudo-code implementation 1100 of the method 1000.

At step 1, 1002, the processor 706 initializes a first parameter K, a second parameter C and a third parameter p. The first parameter K is indicative of the block number of the block under analysis at a particular point of the method 1000. The second parameter C is a collision count. The second parameter C is indicative of a number of collisions that are observed in the output data 302. A collision occurs when the entropy source 704 sequentially outputs two blocks 310 that comprise the same data sequence. That is, when the entropy source 704 outputs two blocks 310 that comprise the same data sequence as consecutive outputs 301, a collision has occurred. The third parameter p is indicative of a previous output block of the entropy source 704. The third parameter p may, for example, be an alphanumeric representation of the previous output block of the entropy source 704. For example, where the previous output block was [1, 0, 1, 1, 0, 1], the third parameter p may be 101101 or 45. At step 1, 1002, each of the first parameter K, second parameter C and third parameter p are initialized to 0.

At step 2, 1004, the processor 706 receives a new output block 310 generated by the entropy source 704. The processor 706 therefore receives a new block 310.

At step 3, 1006, the processor 706 determines a collision entropy estimate. That is, the processor 706 determines an estimate of a collision entropy of the entropy source 704 based on the output data 302 generated by the entropy source 704. The processor 706 sets a value of a fourth parameter t to equal a fifth parameter b. The fifth parameter b is indicative of the new output block of the entropy source 704. The fifth parameter b may, for example, be an alphanumeric representation of the new output block of the entropy source 704. For example, where the new output block is [1, 0, 1, 1, 0, 1], the fifth parameter b may be 101101 or 45. Thus, the fifth parameter b is indicative of the data sequence of the new output block.

The processor 706 increases a value of the first parameter K by 1. That is, the processor sets a value of K to equal a value of K+1 (i.e. K=K+1). Thus, the first parameter K is indicative of the number of blocks 310 that have been considered in the estimate of method 1000.

The processor 706 compares the third parameter p and the fourth parameter t. If third parameter p is equal to the fourth parameter t, the processor 706 increases a value of the second parameter C by one. Therefore, when a collision occurs, the processor 706 increases a value of the second parameter C by one. The second parameter C is therefore a count indicative of a number of collisions that occur in the output data 302.

The processor 706 sets a value of the third parameter p to equal the fourth parameter t. That is, the fourth parameter t is indicative of the most recent block 310 considered. In other words, the previous output block is updated.

The processor 706 computes the estimate of the collision entropy using the second parameter C and the first parameter K. In other words, processor 706 computes the estimate of the collision entropy using the collision count and the number of blocks considered. In particular, the processor 706 computes:

$$X' = -\frac{\log_2 C}{K}$$

Where X' is the estimate of the collision entropy of the entropy source 704.

At step 4, 1008, the processor 706 computes a value for an argument parameter $\theta^{(2)}$ that is indicative of a probability of a most probable block being generated as a new block by the entropy source 704. The processor 706 computes the value for the argument parameter $\theta^{(2)}$ by solving a closed form estimate function that relates the argument parameter $\theta^{(2)}$ to the collision entropy estimate, as described with reference to step 7, 914 of the method 900.

The processor 706 solves for the value of the argument parameter $\theta^{(2)}$ of the closed form estimate function:

$$\theta^{(2)} = \frac{1 + \sqrt{(2^L - 1)(2^{L-X'} - 1)}}{2^L}.$$

At step 5, 1010, the processor 706 determines an estimate of randomness of the entropy source 704 based on the value of the argument parameter $\theta^{(2)}$ as described with reference to step 8, 916 of the method 900. In particular, the processor 706 determines an estimate of a min-entropy of the blocks 310. The processor 706 determines the estimate of the min-entropy of the blocks 310 by computing:

$$H^{(\infty)}(b) = -\log_2 \theta^{(2)}$$

Where $H^{(\infty)}(b)$ is the estimate of the min-entropy of the blocks 310. This may be considered an estimate of randomness of the entropy source 704. The processor 706 uses the length L to tune the estimate of the min-entropy of the blocks 310. In other words, the processor 706 uses the length L to tune the estimate of randomness of the entropy source 704. The processor 706 determines an estimate of a per-bit min-entropy of the entropy source 704 by dividing the estimate of the min-entropy of the blocks 310 by the length L. Thus:

$$H^{(\infty)} = -\frac{\log_2 \theta^{(2)}}{L}$$

Where $H^{(\infty)}$ is the per-bit min-entropy of the entropy source 704 (i.e. the min-entropy associated with 1-bit outputs 301 of the entropy source 704).

Sliding Window Estimator Based on Collision Entropy

Figure 12:
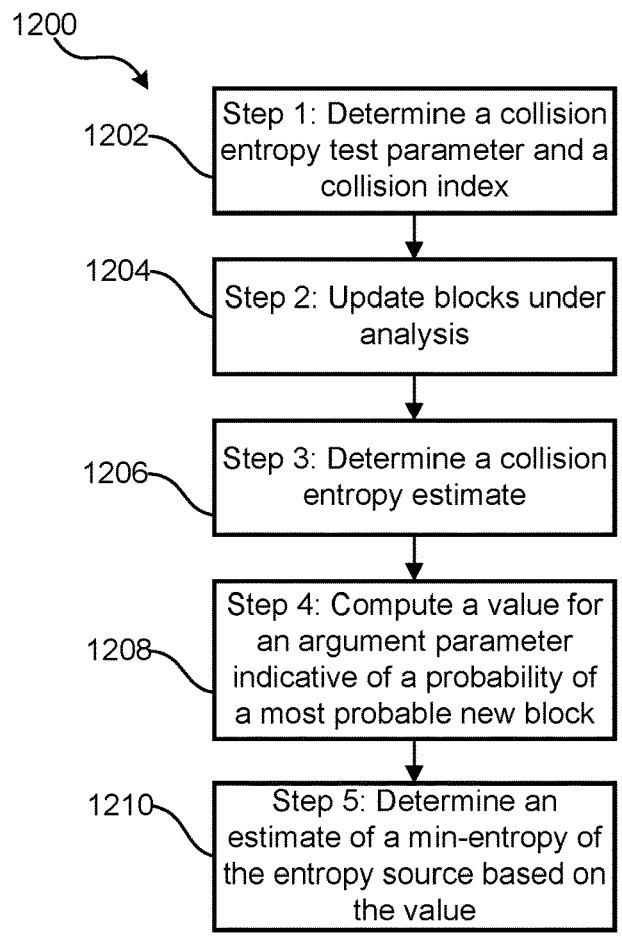
FIG. 12 is a block diagram illustrating another method of estimating randomness of an entropy source.

FIG. 12 illustrates a computer-implemented method 1200 as performed by processor 706 for estimating randomness of the entropy source 704. The entropy source 704 is in the form of a binary random number generator. The method 1200 may therefore be referred to as a method of estimating randomness of a random number generator. FIG. 12 is to be understood as a blueprint for a software program and may be implemented step-by-step, such that each step in FIG. 12 is represented by a function in a programming language, such as C++ or Java. The resulting source code is then compiled and stored as computer executable instructions on memory 708 or implemented in a different computer environment.

Figure 13:
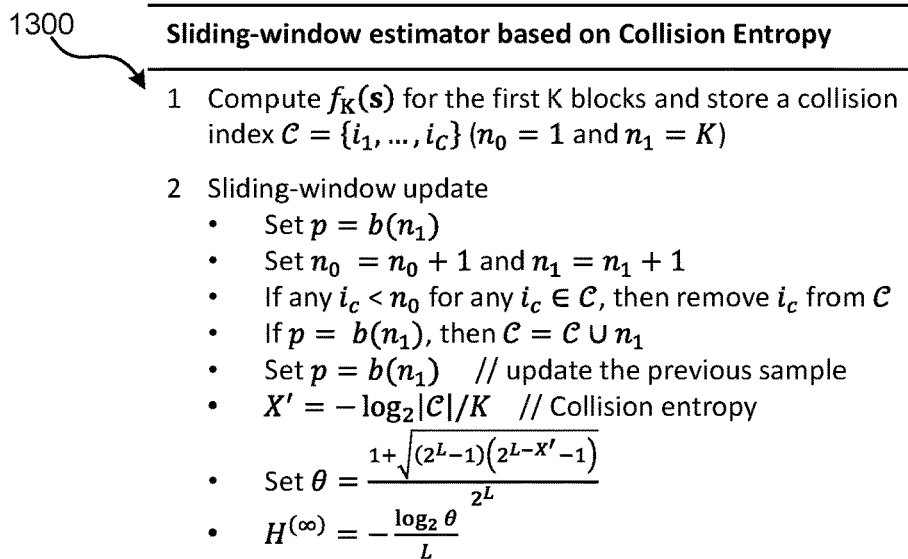
FIG. 13 illustrates pseudo-code associated with the method of FIG. 12.

The method 1200 is based on a determination of an estimate of a collision entropy of the entropy source 704, as described with reference to the method 900. The method 1200 is an online method. That is, the method 1200 updates the estimate of randomness of the entropy source 704 as new outputs are generated by the entropy source 704. FIG. 13 illustrates a pseudo-code implementation 1300 of the method 1200.

At step 1, 1202, the processor 706 determines the collision entropy test parameter $f_K(s)$ using the output data 302. The output data 302 comprises K blocks 310. The processor 706 may determine the collision entropy test parameter $f_K(s)$ using the output data 302 as described with reference to steps 1 to 5, 902 to 910 of the method 900. The processor 706 also stores a collision index $\mathcal{C}$. The collision index $\mathcal{C}$ comprises instances of collisions i, that occur between a first block number $n_0$ and a last block number $n_1$. A block number $n_0$ of the first block of the output data 302 is initially 1, and a block number of the last block of the output data 302 is initially K. The collision index $\mathcal{C}$ may therefore be stored as:

$\mathcal{C} = \{i_1, \ldots, i_C\}(n_0 = 1 \text{ and } n_1 = K)$

Where C is a total number of collisions.

At step 2, 1204, the processor 706 receives an additional block 310 and updates the blocks 310 under analysis. The additional block 310 may be a block 310 that comprises newly generated outputs 301 of the entropy source 704.

The processor 706 sets a value of a first parameter p to equal a second parameter $b(n_1)$. The second parameter $b(n_1)$ is indicative of a previous output block of the entropy source 704. In particular, the second parameter $b(n_1)$ is indicative of the most recent block 310 of the output data 302. The second parameter $b(n_1)$ may, for example, be an alphanumeric representation of the most recent block 310 of the output data 302. For example, where the most recent block 310 was [1, 0, 1, 1, 0, 1], the second parameter $b(n_1)$ may be 101101 or 45. Thus, the second parameter $b(n_1)$ is indicative of the data sequence of the most recent block. As a value of the first parameter p is set to equal the second parameter $b(n_1)$, the first parameter p is indicative of a block 310 most recently considered for the entropy estimate.

The processor 706 increases the block number $n_0$ by one. In other words, the processor 706 sets $n_0 = n_0 + 1$. The processor 706 also increases the block number $n_1$ by one. In other words, the processor 706 sets $n_1 = n_1 + 1$.

The processor 706 removes an instance of collision i stored in the collision index $\mathcal{C}$ if the instance of collision i is associated with a block 310 that is not within the updated range of block numbers (i.e. between $n_0$ and $n_1$ after they have been updated). In other words, if any instance of collision i is associated with a block 310 with a block number that is less than $n_0$, the processor 706 removes that instance of collision i from the collision index $\mathcal{C}$. There are K blocks 310 within the set of blocks 310 bound by those with block numbers of $n_0$ and $n_1$. Therefore, as both the block number $n_0$ and the block number $n_1$ are increased by one, and the instances of collision i with a block number less than $n_0$ are removed from the collision index $\mathcal{C}$, the method 1200 uses a sliding window of K blocks to determine the estimate of randomness of the entropy source 704.

The processor 706 compares the first parameter p to the new block 310. If the first parameter p is equal to, or equivalent to the new block (i.e. if the alphanumeric representation stored as the first parameter p is equal to a corresponding alphanumeric representation of the new block), the processor 706 includes a relevant instance of collision i that is associated with the block number of the new block $n_1$ (after it has been updated) in the collision index $\mathcal{C}$. In other words, the processor 706 updates the collision index $\mathcal{C}$ if the new block 310 is equal to, or equivalent to the preceding block 310.

At step 3, 1206, the processor 706 determines a collision entropy estimate based on the collision index $\mathcal{C}$ and the number K of blocks 310 in the sliding window. In particular, the processor 706 computes the collision entropy estimate using the number of instances of collision i in the collision index $\mathcal{C}$ (which may be referred to as a collision count) and the number K of blocks 310 in the sliding window:

$$X' = -\frac{\log_2 |\mathcal{C}|}{K}$$

Where X' is the estimate of the collision entropy of the entropy source 704.

At step 4, 1208, the processor 706 computes a value for an argument parameter $\theta^{(2)}$ that is indicative of a probability of a most probable block being generated as a new block by the entropy source 704. The processor 706 computes the value for the argument parameter $\theta^{(2)}$ by solving a closed form estimate function that relates the argument parameter $\theta^{(2)}$ to the collision entropy estimate, as described with reference to step 7, 914 of the method 900.

The processor 706 solves for the value of the argument parameter $\theta^{(2)}$ of the closed form estimate function:

$$\theta^{(2)} = \frac{1 + \sqrt{(2^L - 1)(2^{L-X'} - 1)}}{2^L}.$$

At step 5, 1210, the processor 706 determines an estimate of randomness of the entropy source 704 based on the value of the argument parameter $\theta^{(2)}$ as described with reference to step 8. 916 of the method 900. In particular, the processor 706 determines an estimate of a min-entropy of the blocks 310. The processor 706 determines this estimate of the min-entropy of the blocks 310 by computing:

$$H^{(\infty)}(b) = -\log_2 \theta^{(2)}$$

Where $H^{(\infty)}(b)$ is the estimate of the min-entropy of the blocks 310. This may be considered an estimate of randomness of the entropy source 704. The processor 706 uses the length L to tune the estimate of the min-entropy of the blocks 310. In other words, the processor 706 uses the length L to tune the estimate of randomness of the entropy source 704. The processor 706 determines an estimate of a per-bit min-entropy of the entropy source 704 by dividing the estimate of the min-entropy of the blocks 310 by the length L. Thus:

$$H^{(\infty)} = -\frac{\log_2 \theta^{(2)}}{L}$$

Where $H^{(\infty)}$ is the per-bit min-entropy of the entropy source 704 (i.e. the min-entropy associated with 1-bit outputs 301 of the entropy source 704).

Performance of the Methods

Figure 14:
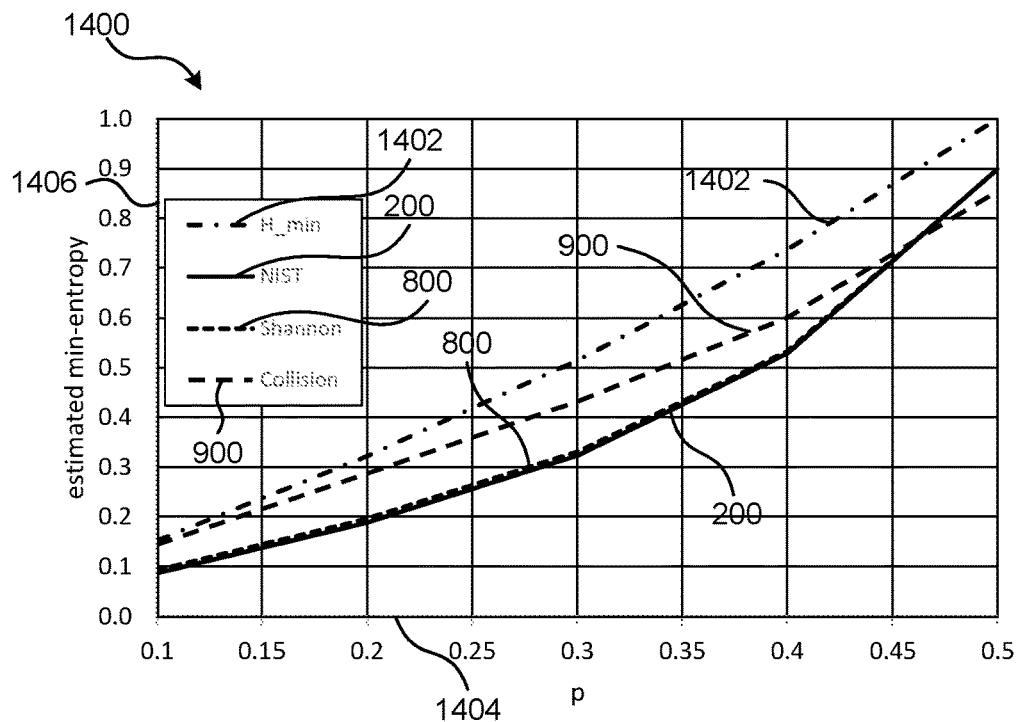
FIG. 14 is a chart comparing performance of the methods of FIGS. 2, 8 and 9 with respect to a binary memoryless entropy source.

The disclosed methods 800, 900, 1100 and 1200 can significantly reduce the computational complexity, and therefore expense of estimating randomness of an entropy source relative to existing methods, whilst providing comparable or improved randomness estimates. FIG. 14 illustrates a chart 1400 comparing the performance of the method 200, the method 800 and the method 900 when estimating randomness of a binary memoryless entropy source, by comparing them to an actual min-entropy 1402 of the binary memoryless entropy source. An x-axis of FIG. 14 illustrates probabilities 1404 of occurrence of possible outputs of the binary memoryless entropy source. A y-axis of FIG. 14 illustrates estimations of min-entropy 1406 of the binary memoryless entropy source as determined by each of the method 200, the method 800 and the method 900. As is apparent from FIG. 14, the method 800 generates comparable min-entropy estimates when compared to the method 200, however the method 800 is significantly less computationally complex. The method 900 generally generates improved min-entropy estimates than those generated by the method 200 (i.e. they are closer to the actual min-entropy 1402), and the method 900 is also significantly less computationally complex than the method 200.

Figure 15:
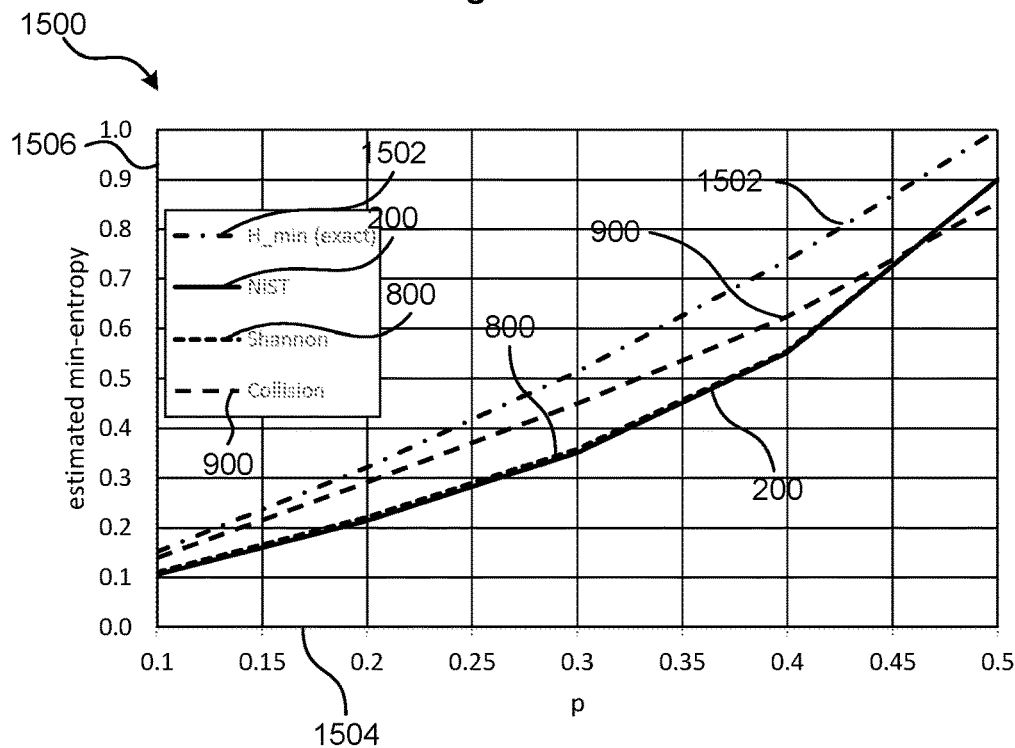
FIG. 15 is a chart comparing performance of the methods of FIGS. 2, 8 and 9, with respect to a Markov entropy source.

FIG. 15 illustrates a chart 1500 comparing the performance of the method 200, the method 800 and the method 900 when estimating randomness of a Markov entropy source. An x-axis of FIG. 15 illustrates probabilities 1504 of occurrence of possible outputs of the Markov entropy source. A y-axis of FIG. 15 illustrates estimations of min-entropy 1506 as determined by each of the method 200, the method 800 and the method 900. The method 200, the method 800 and the method 900 are compared to an actual min-entropy 1502 of the Markov entropy source. Again, it is apparent that the method 800 provides generally comparable min-entropy estimates when compared to the method 200, and the method 900 provides generally improved min-entropy estimates when compared to the method 200 (i.e. they are closer to the actual min-entropy 1502), even though both the method 800 and the method 900 are significantly less computationally complex than the method 200.

Figure 16:
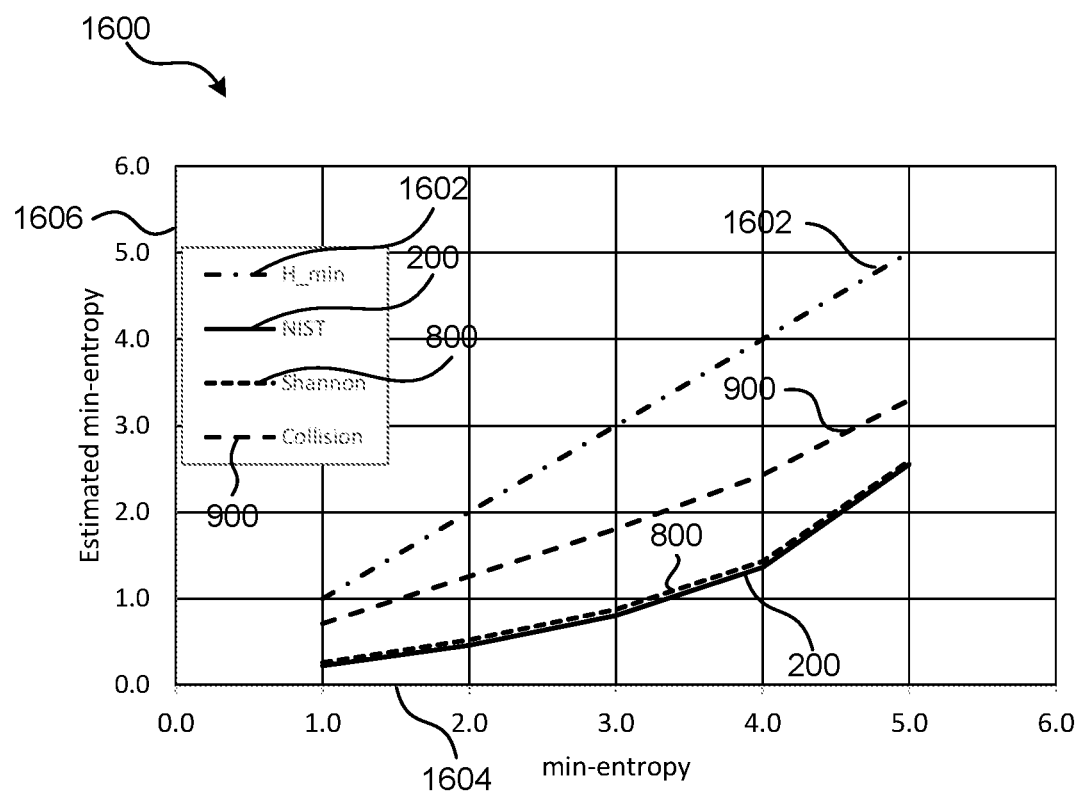
FIG. 16 is a chart comparing performance of the methods of FIGS. 2, 8 and 9, with respect to a discretized normal distribution entropy source.

FIG. 16 illustrates a chart 1600 comparing the performance of the method 200, the method 800 and the method 900 when estimating randomness of a discretized normal distribution entropy source. An x-axis of FIG. 16 illustrates probabilities 1604 of occurrence of possible outputs of the discretized normal distribution entropy source. A y-axis of FIG. 16 illustrates estimations of min-entropy 1606 as determined by each of the method 200, the method 800 and the method 900. The method 200, the method 800 and the method 900 are compared to an actual min-entropy 1602 of the discretized normal distribution entropy source. Again, it is apparent that the method 800 provides generally comparable min-entropy estimates when compared to the method 200, and the method 900 provides generally improved min-entropy estimates when compared to the method 200 (i.e. they are closer to the actual min-entropy 1602), even though both the method 800 and the method 900 are significantly less computationally complex than the method 200.

Figure 17:
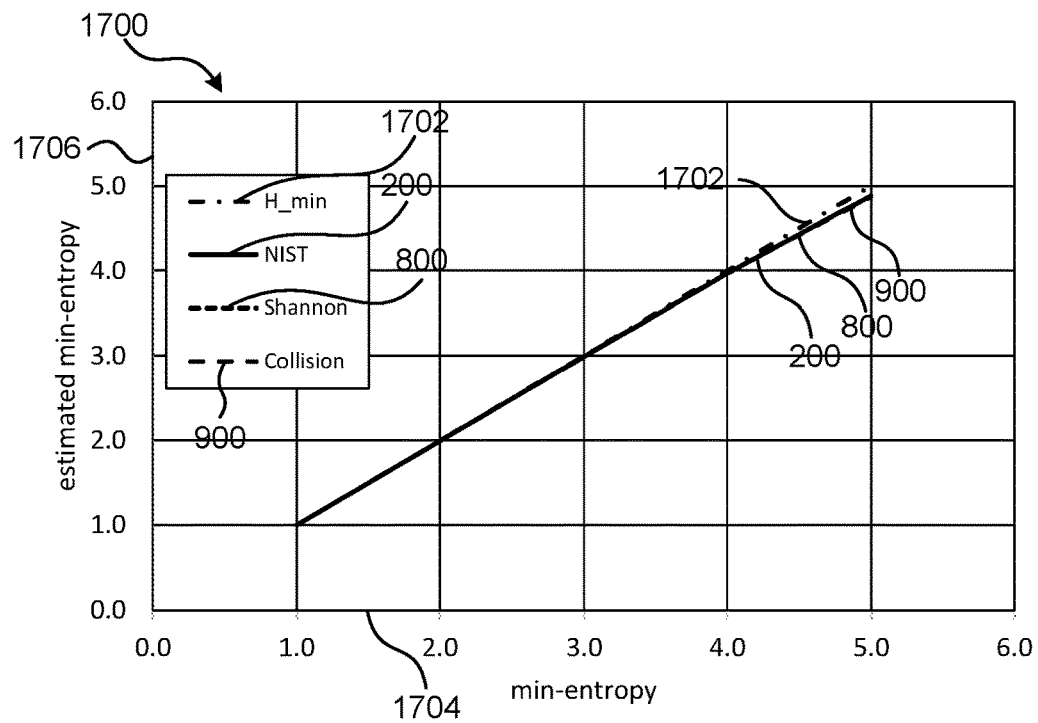
FIG. 17 is a chart comparing performance of the methods of FIGS. 2, 8 and 9, with respect to a near-uniform distribution entropy source.
Figure 18:
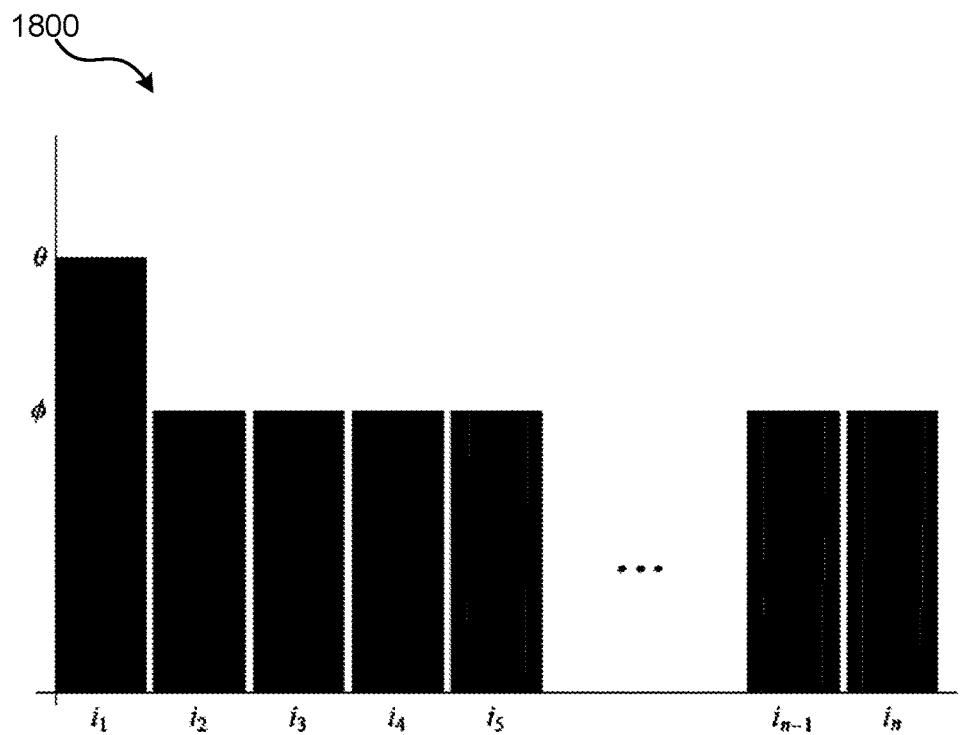
FIG. 18 is a chart illustrating a probability distribution of a near-uniform distribution entropy source.

FIG. 17 illustrates a chart 1700 comparing the performance of the method 200, the method 800 and the method 900 when estimating randomness of a near-uniform distribution entropy source. FIG. 18 illustrates a probability distribution 1800 of the near-uniform distribution entropy source. The near-uniform distribution entropy source generates outputs according to a near-uniform distribution with a first output $i_n$ generated with a probability $\theta$ and a plurality of additional outputs $i_2$-$i_n$ generated with a probability $\varphi$. An x-axis of FIG. 17 illustrates probabilities 1704 of occurrence of possible outputs of the near-uniform distribution entropy source. A y-axis of FIG. 18 illustrates estimations of min-entropy 1606 as determined by each of the method 200, the method 800 and the method 900. The method 200, the method 800 and the method 900 are compared to an actual min-entropy 1702 of the near-uniform distribution entropy source. FIG. 17 illustrates that the method 800 and the method 900 both provide generally comparable min-entropy estimates compared to the method 200. Each of the method 200, the method 800 and the method 900 provide min-entropy estimates that generally match the actual min-entropy 1702, yet the method 800 and the method 900 are significantly less computationally complex than the method 200.

Figure 19:
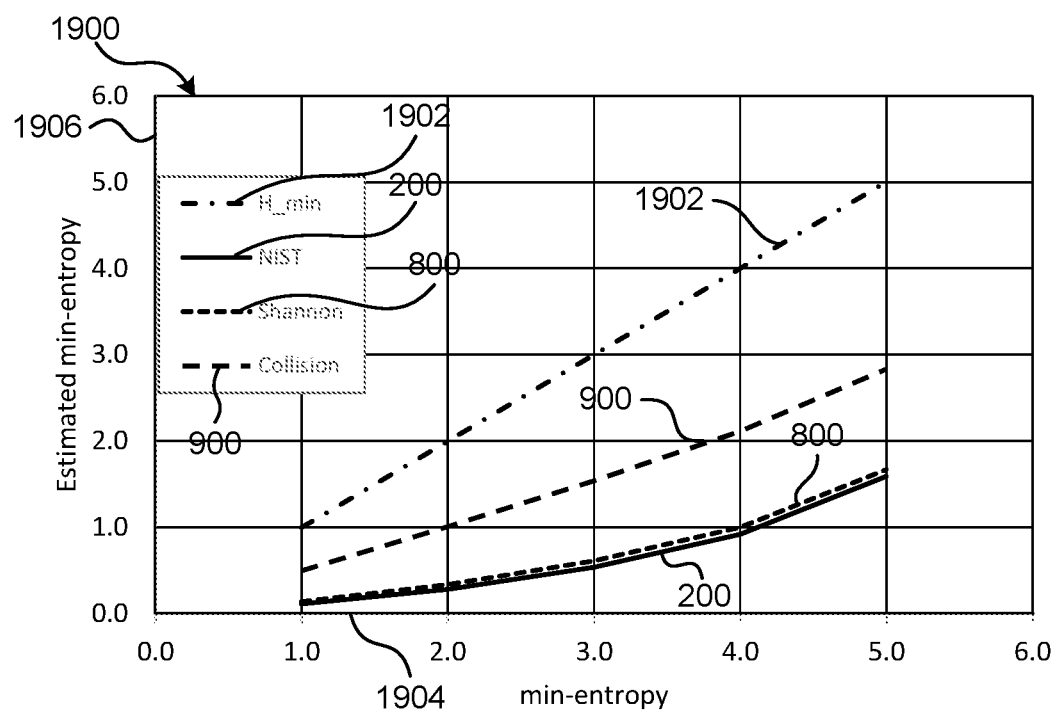
FIG. 19 is a chart comparing performance of the methods of FIGS. 2, 8 and 9, with respect to an inverted near-uniform distribution entropy source.
Figure 20:
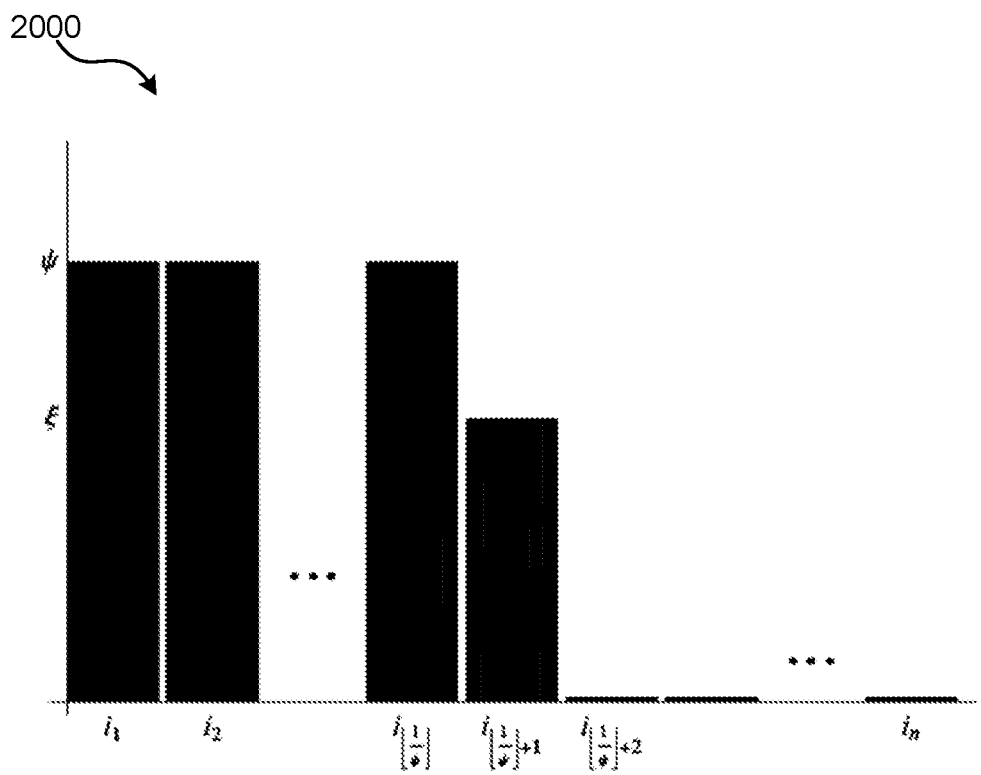
FIG. 20 is a chart illustrating a probability distribution of an inverted near-uniform distribution entropy source.

FIG. 19 illustrates a chart 1900 comparing the performance of the method 200, the method 800 and the method 900 when estimating randomness of an inverted near-uniform distribution entropy source. FIG. 20 illustrates a probability distribution 2000 of the inverted near-uniform distribution entropy source. The inverted near-uniform distribution entropy source generates outputs according to an inverted near-uniform distribution with outputs $$i_1 - i_{\frac{1}{\psi}}$$

generated with a probability $\psi$, output $$i_{\frac{1}{\psi}+1}$$

generated with a probability $\xi$, and a last output in generated with a probability of approximately 0. An x-axis of FIG. 19 illustrates probabilities 1904 of occurrence of possible outputs of the inverted near-uniform distribution entropy source. A y-axis of FIG. 19 illustrates estimations of min-entropy 1906 as determined by each of the method 200, the method 800 and the method 900. The method 200, the method 800 and the method 900 are compared to an actual min-entropy 1902 of the inverted near-uniform distribution entropy source. FIG. 19 illustrates that the method 800 and the method 900 both provide generally comparable min-entropy estimates compared to the method 200. Each of the method 200, the method 800 and the method 900 provide min-entropy estimates that generally match the actual min-entropy 1902, yet the method 800 and the method 900 are significantly less computationally complex than the method 200.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

It will be appreciated by persons skilled in the art that the present invention is not limited to what has been particularly shown and described herein. Rather, the scope of the present invention is defined only by the claims that follow.

The invention claimed is:

1. A computer-implemented method for estimating randomness of a random number generator, the method comprising:
dividing output data, generated by the random number generator, into blocks of a length (L);
estimating a Shannon entropy of a second sub-set of the blocks, using a first sub-set of the blocks to initialize the estimating, wherein:
the output data is represented as $s=(s_1, \ldots, s_n)$;
$s_1, \ldots, s_n$ are outputs of the output data;
the first sub-set comprises Q blocks;
the second sub-set comprises K blocks;
estimating the Shannon entropy comprises calculating a test statistic $f_c(s)$ associated with the output data using a Shannon entropy test function:

$$f_c(s) = \frac{1}{K} \sum_{n=Q+1}^{Q+K} g(D_n(s))$$

where, $$g(i) = \frac{1}{\log 2} \sum_{k=1}^{i-1} \frac{1}{k},$$

and
$D_n(s)$ is a distance value that is determined for each block of the second sub-set; and
calculating the test statistic $f_c(s)$ reduces a computational complexity of estimating the Shannon entropy by reducing a number of iterations performed;
solving an estimate function, that relates an argument parameter (θ) to the Shannon entropy estimate, to determine a value for the argument parameter (θ) that is indicative of a probability of a most probable block being generated by the random number generator as a new block; and
using the length (L) to tune an estimate of randomness of the random number generator calculated based on the value for the argument parameter (θ).

2. The computer-implemented method of claim 1, wherein the tuned estimate of randomness of the random number generator corresponds to an estimate of a min-entropy of the random number generator.

3. The computer-implemented method of claim 1, wherein the blocks are adjacent and do not overlap.

4. The computer-implemented method of claim 1, wherein estimating the Shannon entropy comprises determining a distance value ($D_n(s)$) for each block of the second sub-set, each distance value ($D_n(s)$) indicating:
a number of blocks separating that block from a previous instance of the block in the output data; or
a number of blocks separating the block from a first block of the first sub-set.

5. The computer-implemented method of claim 4, wherein estimating the Shannon entropy comprises solving a distance value function $g_c$ (i) using each distance value ($D_n(s)$) to determine a distance value function value $g_c$ ($D_n(s)$) for each block of the second sub-set.

6. The computer-implemented method of claim 5, wherein:
estimating the Shannon entropy comprises determining a standard deviation $\hat{\sigma}$ associated with the distance value function values $g_c$ ($D_n(s)$); and
the Shannon entropy is estimated based on a mean of the distance value function values $g_c(D_n (s))$ and the standard deviation $\hat{\sigma}$.

7. The computer-implemented method of claim 1, further comprising:
calculating a standard deviation ($\hat{\sigma}$) associated with the distance values ($D_n(s)$); and
estimating the Shannon entropy based on the test statistic ($f_c(s)$) and the standard deviation ($\hat{\sigma}$).

8. The computer-implemented method of claim 7, wherein:
estimating the Shannon entropy comprises calculating a lower bound X' of a confidence interval for the test statistic ($f_c(s)$); and
the lower bound X' is the estimate of the Shannon entropy.

9. The computer-implemented method of claim 8, wherein calculating the lower bound X' comprises calculating:

$$X' = f_c(s) - 2.576 \frac{\hat{\sigma}}{\sqrt{K}}.$$

10. The computer-implemented method of claim 8, wherein solving the estimate function comprises solving for the argument parameter (θ) in:

$X'=h(\theta)+(1-\theta)\log_2(B-1)$ where $h(\theta)=-\theta \log_2\theta-(1-\theta)\log_2(1-\theta)$, $B=2^L$, X' is the lower bound of the confidence interval for the test statistic ($f_c(s)$), and (L) is the length.

11. The computer-implemented method of claim 1, further comprising using a bisection method to solve the estimate function to determine the value for the argument parameter (θ).

12. The computer-implemented method of claim 1, wherein:
the estimate function is a modified form of an equality case of Fano's inequality; and the estimated Shannon entropy is substituted for an entropy term of Fano's inequality.

13. The computer-implemented method of claim 1, wherein the estimate of randomness of the random number generator is an estimate of a min-entropy of a sub-set of the blocks.

14. The computer-implemented method of claim 1, wherein the estimate of randomness of the random number generator is determined by calculating:

$$-\log(\theta)$$

where $\theta$ is the value for the argument parameter ($\theta$).

15. The computer-implemented method of claim 1, wherein tuning the estimate of randomness of the random number generator comprises dividing the estimate of randomness of the random number generator by the length (L).

16. The computer-implemented method of claim 1, wherein tuning the estimate of randomness of the random number generator comprises calculating:

$$-\frac{\log(\theta)}{L}$$

where $\theta$ is the value for the argument parameter ($\theta$) and L is the length.

17. An apparatus for estimating randomness of a random number generator, the apparatus comprising:
a memory; and
a processor configured to:
divide output data, generated by the random number generator, into blocks of a length (L);
estimate a Shannon entropy of a second sub-set of the blocks, using a first sub-set of the blocks to initialize the estimating, wherein:
the output data is represented as $s=(s_1, \ldots, s_n)$;
$s_1, \ldots, s_n$ are outputs of the output data;
the first sub-set comprises Q blocks;
the second sub-set comprises K blocks;
estimating the Shannon entropy comprises calculating a test statistic $f_c(s)$ associated with the output data using a Shannon entropy test function:

$$f_c(s) = \frac{1}{K} \sum_{n=Q+1}^{Q+K} g(D_n(s))$$

where, $$g(i) = \frac{1}{\log 2} \sum_{k=1}^{i-1} \frac{1}{k},$$

$D_n(s)$ is a distance value that is determined for each block of the second sub-set; and
calculating the test statistic $f_c(s)$ reduces a computational complexity of estimating the Shannon entropy by reducing a number of iterations performed;

solve an estimate function, that relates an argument parameter ($\theta$) to the Shannon entropy estimate, to determine a value ($\theta^*$) for the argument parameter ($\theta$) that is indicative of a probability of a most probable block being generated by the random number generator as a new block; and
use the length (L) to tune an estimate of randomness of the random number generator calculated based on the value for the argument parameter ($\theta$).

18. An apparatus for estimating randomness of a random number generator, the apparatus comprising:
a memory;
a processor;
means, stored in the memory for execution by the processor, for dividing output data, generated by the random number generator, into blocks of a length (L);
means, stored in the memory for execution by the processor, for estimating a Shannon entropy of a second sub-set of the blocks, using a first sub-set of the blocks to initialize the estimating, wherein:
the output data is represented as $s=(s_1, \ldots, s_n)$;
$s_1, \ldots, s_n$ are outputs of the output data;
the first sub-set comprises Q blocks;
the second sub-set comprises K blocks;
estimating the Shannon entropy comprises calculating a test statistic $f_c(s)$ associated with the output data using a Shannon entropy test function:

$$f_c(s) = \frac{1}{K} \sum_{n=Q+1}^{Q+K} g(D_n(s))$$

where, $$g(i) = \frac{1}{\log 2} \sum_{k=1}^{i-1} \frac{1}{k},$$

, and
$D_n(s)$ is a distance value that is determined for each block of the second sub-set; and
calculating the test statistic $f_c(s)$ reduces a computational complexity of estimating the Shannon entropy by reducing a number of iterations performed;
means, stored in the memory for execution by the processor, for solving an estimate function, that relates an argument parameter ($\theta$) to the Shannon entropy estimate, to determine a value ($\theta^*$) for the argument parameter ($\theta$) that is indicative of a probability of a most probable block being generated by the random number generator as a new block; and
means, stored in the memory for execution by the processor, for using the length (L) to tune an estimate of randomness of the random number generator calculated based on the value for the argument parameter ($\theta$).

* * * * *